(12) United States Patent
Sidman

(10) Patent No.: US 8,179,078 B2
(45) Date of Patent: May 15, 2012

(54) HANDHELD OR VEHICLE-MOUNTED PLATFORM STABILIZATION SYSTEM

(76) Inventor: Adam D. Sidman, Colorado Springs, CO (US)

( * ) Notice: Subject to any disclaimer, the term of this patent is extended or adjusted under 35 U.S.C. 154(b) by 362 days.

(21) Appl. No.: 12/631,843

(22) Filed: Dec. 6, 2009

(65) Prior Publication Data

US 2010/0079101 A1 Apr. 1, 2010

Related U.S. Application Data

(63) Continuation-in-part of application No. 11/379,783, filed on Apr. 22, 2006, now Pat. No. 7,642,741.

(60) Provisional application No. 60/675,155, filed on Apr. 27, 2005.

(51) Int. Cl.
*G05B 1/06* (2006.01)

(52) U.S. Cl. ............... 318/649; 318/648; 318/638

(58) Field of Classification Search .......... 318/649, 318/648, 638, 838

See application file for complete search history.

(56) References Cited

U.S. PATENT DOCUMENTS

| 4,017,168 | A | 4/1977 | Brown |
|---|---|---|---|
| 4,520,973 | A | 6/1985 | Clark et al. |
| 4,542,962 | A | 9/1985 | Stromberg |
| RE32,213 | E | 7/1986 | Brown |
| 4,774,589 | A | 9/1988 | Rowland |
| 4,989,466 | A | 2/1991 | Goodman |
| 5,184,521 | A | 2/1993 | Tyler |
| 5,243,370 | A | 9/1993 | Slater |
| 5,253,071 | A | 10/1993 | MacKay |
| 5,335,032 | A | 8/1994 | Onuki et al. |
| 5,579,071 | A | 11/1996 | Wetzel et al. |
| 5,873,004 | A * | 2/1999 | Shiomi ............... 396/52 |
| 5,897,223 | A | 4/1999 | Tritchew et al. |
| 6,002,431 | A | 12/1999 | Jung et al. |
| 6,067,194 | A | 5/2000 | Stroemberg |
| 6,233,009 | B1 | 5/2001 | Morofuji et al. |
| 6,263,160 | B1 | 7/2001 | Lewis |
| 6,515,799 | B2 * | 2/2003 | Ishijima et al. ......... 359/557 |
| 6,542,181 | B1 | 4/2003 | Houska et al. |
| 6,611,662 | B1 | 8/2003 | Grober |
| 6,685,148 | B2 | 2/2004 | Zadok |
| 6,718,130 | B2 | 4/2004 | Grober |
| 6,730,049 | B2 | 5/2004 | Kalvert |
| 2005/0031335 | A1 | 2/2005 | Itzkowitz |

OTHER PUBLICATIONS

Koichi Sato et al., "Control Techniques for Optical Image Stabilizing System," IEEE Transactions on Consumer Electronics, vol. 39, No. 3, pp. 461-466, Aug. 1993, USA.

(Continued)

*Primary Examiner* — Walter Benson
*Assistant Examiner* — David Luo
(74) *Attorney, Agent, or Firm* — James Albert Ward

(57) ABSTRACT

A hand-held or vehicle-mounted stabilization system including a platform supported by two or more rotatably-coupled gimbal frames each having a pivot assembly disposed at its rotation axis to couple an actuator to a rotation sensor having a rotation-sensitive sensor axis that is preferably fixedly disposed with respect to the rotation axis, and a controller for accepting the sensor signals and for producing each motor signal needed to dispose the platform in a predetermined angular position with respect to each rotation axis independent of changes in mount orientation. An alternative embodiment includes a controller for accepting an external slew signal sequence and for producing the motor signals needed to move the platform along a predetermined sequence of positions represented by the slew signal sequence.

20 Claims, 14 Drawing Sheets

OTHER PUBLICATIONS

Mitsuaki Oshima et al., "VHS Camcorder With Electronic Image Stabilizer," IEEE Transactions on Consumer Electronics, vol. 35, No. 4, pp. 749-758, Nov. 1989, USA.

Toshiro Kinugasa et al., "Electronic Image Stabilizer for Video Camera Use," IEEE Transactions on Consumer Electronics, vol. 36, No. 3, pp. 520-525, Aug. 1990, USA.

Don Murray et al., "Motion Tracking With an Active Camera," IEEE Transactions on Pattern Analysis and Machine Intelligence, vol. 16, No. 5, pp. 449-459, May 1994, USA.

Marcel Algrain et al., "Accelerometer Based Line-of-Sight Stabilization Approach for Pointing and Tracking Systems," Second IEEE Conference on Control Applications, pp. 159-163, Sep. 13-16, 1993, Vancouver, B.C., Canada.

* cited by examiner

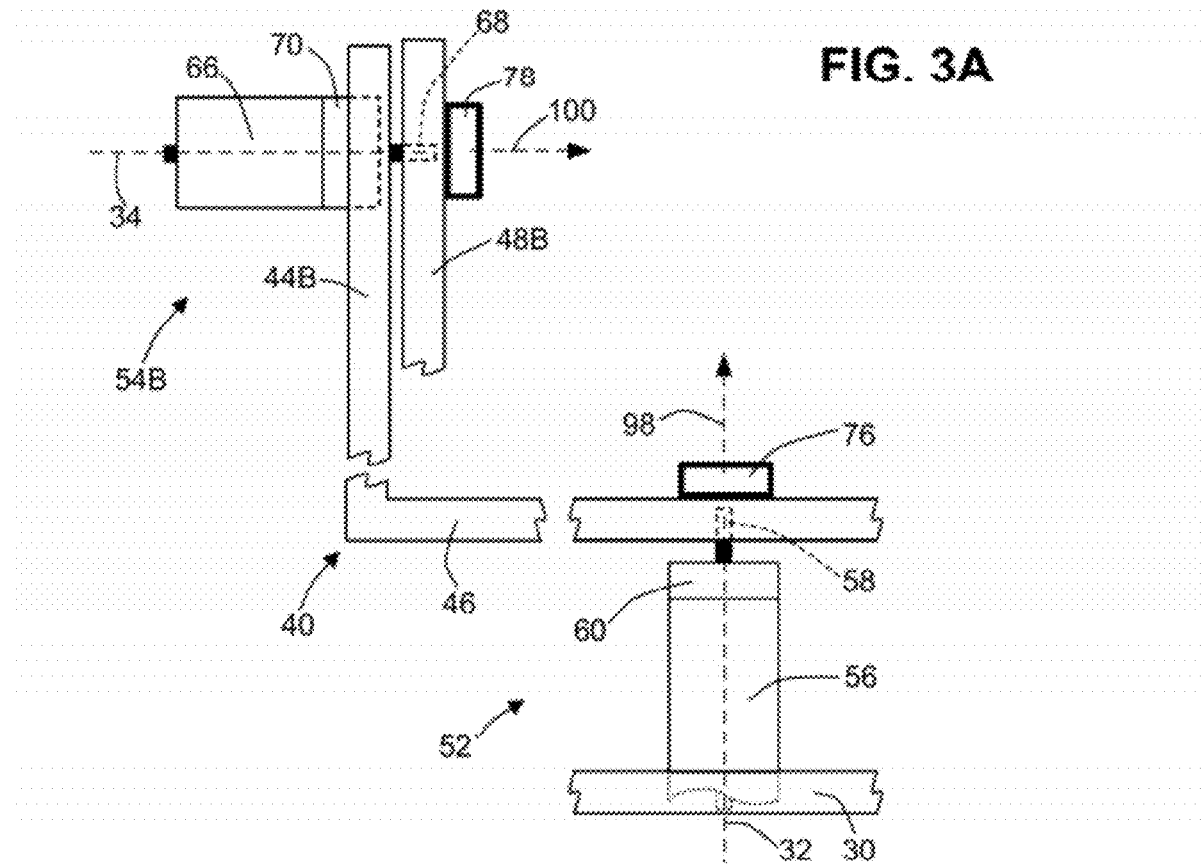
FIG. 3A
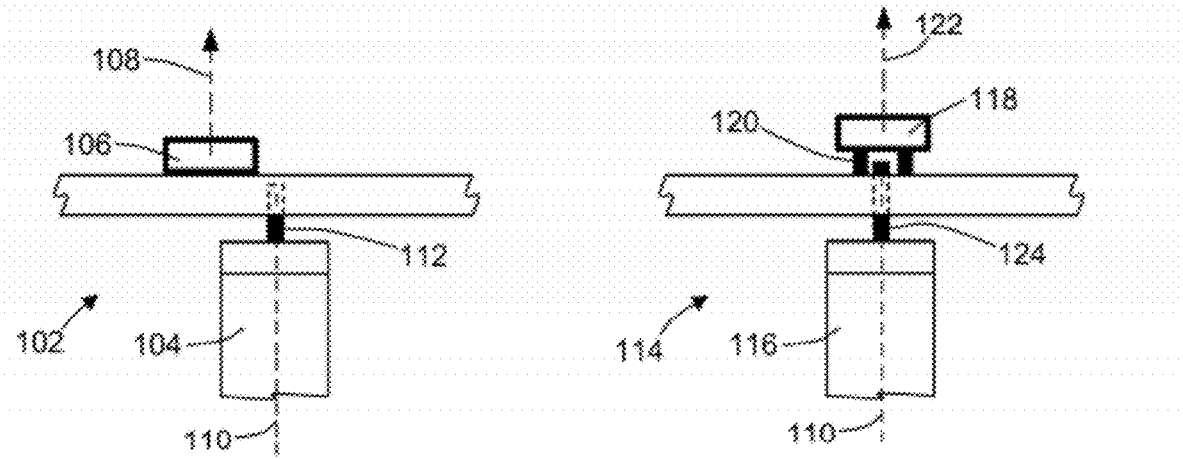
FIG. 3B
FIG. 3C

HANDHELD OR VEHICLE-MOUNTED PLATFORM STABILIZATION SYSTEM

CROSS-REFERENCES TO RELATED APPLICATIONS

This application is filed pursuant to 37 C.F.R. 1.53(b)(2) as a continuation-in-part claiming the benefit under 35 U.S.C. §120 of the pending U.S. patent application Ser. No. 11/379,783 filed by the same inventor on Apr. 27, 2006, which claims benefit under 35 U.S.C. §119(e) of the provisional Patent Application No. 60/675,155 filed on Apr. 27, 2005, and entirely incorporated herein by reference.

BACKGROUND OF THE INVENTION

1. Field of the Invention

This invention relates generally to camera stabilization systems and more particularly to an inexpensive lightweight handheld camera stabilization system employing distributed gyro rotation sensors to facilitate stabilization over a wide range of camera positions.

2. Description of the Related Art

Introduction: Advances in optical, video, cinema and traditional photographic technologies have made high quality portable photographic equipment available to a growing number of film enthusiasts. As a result, motion pictures of increased quality and complexity are produced by professionals and enthusiasts alike. However, this quality evolution has exacerbated the well-known "jitter" problem when shooting with a hand held camera. Even when the operator tries to hold the camera steady during panning or translation, the transmission of uncontrolled operator motion to the camera results in unwanted camera jitter, detracting from the aesthetics of the resulting video product. Shooting from a moving, floating or airborne vehicle is even more difficult because of the uncontrolled vehicle motion. Turning or carrying a camera in a smooth glide requires a great deal of skill and experience, particularly in action scenes where the camera operator is walking, running, or riding in a vehicle to follow the subject of the film. In action situations, the already difficult task of holding a camera steady despite motions resulting from the operator's breathing, heartbeat, and involuntary muscle movements, may be aggravated by uncontrolled environmental conditions. The resulting footage is often erratic, jerky, and visually unappealing. Motion disturbances, particularly angular disturbances transmitted from the operator to the camera, are the primary problem.

Mechanical Stabilizers: Some time ago, in U.S. Pat. Nos. 4,017,168 and Re 32,213, Brown disclosed a popular mechanical (non-electronic) camera stabilization device (the Steadicam®). The Steadicam rig uses a large counterweight mounted a significant distance from the camera that shifts the rig's center of mass to a handle that the operator then manipulates. Although popular, Brown's device is heavy, large and awkward, puts a strain on the operator, requires a long set up time, requires a cumbersome operator harness, and limits the range of camera movement. The operational smoothness of a Steadicam depends mainly on the operator because the operator must manually control the camera's orientation via a handle and must carefully keep the camera poised and balanced within the narrow range of system capabilities. This makes operation of and smooth slewing of the camera a function of operator strength and skill.

Rotating Flywheels: Other practitioners have proposed reaction wheel flywheels for camera stabilization. For example, in U.S. Pat. No. 4,774,589, Rowland discloses a stabilizer that measures the torque applied to the visual system about an axis and applies a reactive counter-torque created by accelerating an attached flywheel. An additional flywheel is needed on each axis, which adds significant weight to a handheld stabilizer and creates unwanted gyroscopic precession dynamics in the system. Stabilizers based on reaction wheels, such as Rowland's, do not isolate operator motion from the camera below 1 Hz, because correction torque is developed by accelerating the reaction flywheel. Because there are practical limits on how fast the flywheel can be spun up, there is a limitation on how long it can be continuously accelerated and used as a source of stabilizing counter-torque. Rowland's device permits only slow manual panning because his stabilizer attempts to suppress rapid panning as undesirable vibration. Rowland suggests that "not using gyroscopes is an advantage" but does not suggest how to avoid the disadvantages of the heavy counter-torquing flywheels.

In U.S. Pat. No. 6,730,049, Kalvert discloses a device for stabilizing tremors that fixes one or more gyroscopic flywheels running at a high, constant speed to a rigid splint for receiving a patient's hand, wrist and forearm to stabilize hand tremors. Similarly, a high-speed, flywheel can be attached to a camcorder, handheld camera, spotting scope or binocular to stabilize it in two or more axes. Kenyon Labs produces KS-2, KS-4, KS-6, KS-8 and KS-12 sealed dual counter-rotating brass or tungsten flywheels ("gyros") that are spun by brushless motors at about 22,000 RPM in a bulky "hermetically sealed helium-filled housing" in an apparent effort to reduce high drag, heat dissipation and power consumption. One "gyro" mounted to a camera in line with the lens will resist motion in both pitch and yaw. Three such "gyros" may be mounted to a camera orthogonally to stabilize motion in more than two axes. The higher the moment of inertial of the flywheel and the faster it is spun, the more effective it is in stabilization. However a flywheel's moment of inertia is increased only by adding size and/or mass, and high speeds cause high drag—all disadvantageous for a lightweight, battery-powered handheld stabilizer. Kenyon Labs' camera stabilizer units require 26 continuous watts of power for 4 to 7 minutes to spin up, weigh up to 5 pounds or more, and are up to 6 inches long.

Lens-Only Stabilizers: Other practitioners propose camera image (lens-only) stabilization methods that rely on controlling the motion of a camera's lens alone, without considering the motion of the camera body. Image or lens-only stabilization has the disadvantage of very limited range of motion. No provision is made for panning over a wide range or for any automatic slewing. And, without relative position sensors and control logic, such systems are inherently unable to distinguish between intentional and unintentional operator motion—they recognize fast panning as undesirable vibration and act to suppress it. Because these methods operate only to actuate the lens vertically or horizontally, they cannot provide compensation for camera roll and they require lens position sensors for active control and end-of-range sensing. Several exemplary image or lens-only stabilization techniques are now discussed.

In U.S. Pat. No. 5,335,032, Onuki, et al. disclose such a lens-only stabilization apparatus that processes the output from an angular accelerometer in both a high-pass filter "for cutting the DC component of the angular acceleration signal" from the angular accelerometer and an integrator for "integrating the angular acceleration signal" to estimate "the angular velocity of vibration occurring in the lens." An optical lens position sensor is employed to sense end-of-travel of the lens during panning.

Sato et al. [Sato et al., "Control Techniques for Optical Image Stabilization System," *IEEE Transactions on Consumer Electronics*, Vol. 39, No. 3, August 1993] describe another such lens-only stabilization apparatus that rotates an optical "fluid prism" based on signals from an "angular velocity sensor" using "conventional PID (Proportional-Integral-Derivative)" control. The two angular velocity sensors used to detect pitching and yawing are not described. Disadvantageously, position and speed information are sensed and fed back from the prism unit to the controller. Also, fast panning apparently could be detected by the microprocessor as "unexpected fluctuation" and acted upon as undesirable vibration when it "distinguishes unexpected fluctuation from intentional panning and tilting"

Oshima et al. [Oshima et al., "VHS Camcorder with Electronic Image Stabilizer," *IEEE Transactions on Consumer Electronics*, Vol. 35, No. 4, November 1989], describe yet another such lens-only stabilization method for discriminating between intentional and unintentional operator motion, using a microcomputer to perform "a time-domain statistical analysis of the detected angular velocity of the camera body" by making use of both a pair of piezoelectric vibratory angular rate gyros as well as two Hall-effect sensors to "detect the position of the lens relative to the camera body." The requisite processing requires a dedicated microprocessor and associated software.

In U.S. Pat. No. 4,542,962, Strömberg describes a mechanical lens-only image stabilization system. Like Brown (the Steadicam) above, Strömberg relies on counterweights to buffer external vibration and help stabilize the image.

Similar commercially-available stabilized lenses are sold by Canon and Nikon. Nikon advertises that their "Vibration Reduction (VR) technology offers the equivalent of using a shutter speed 3 stops faster. In addition, active vibration mode selection possible for use in active situations such as a moving boat, car or plane and provides VR performance with Automatic detection of panning." Panasonic offers a family of image stabilized digital cameras (Lumix Digital Cameras with MEGA Optical Image Stabilizer). Panasonic advertises that their Lumix DMC-FZ20K "has a built-in gyrosensor that detects any hand movement and relays a signal to a tiny microcomputer inside the camera, which instantly calculates the compensation needed. A linear motor then shifts the Optical Image Stabilizer lens as necessary to guide incoming light form the image straight to the CCD." Minolta offers a digital camera that moves the image sensor instead of the lens to counteract camera shake. Minolta advertises that their DiMAGE A2 digital camera "features a CCD-shift mechanism to stabilize images by offsetting the shaking pattern of the user's hand. This gives unrivaled stability at up to 3 shutter speeds slower than on digital cameras without an Anti-Shake function."

Exemplary of the limited stabilization ranges of such lens-only techniques is the gyro-stabilized binoculars produced and marketed as the Fujinon Techno-Stabi 14×40, for example, which provides only a ±5° "stabilization freedom" in a "lightweight" (three pound) package including two direct drive motors controlled by piezoelectric vibration sensors.

Electronic Image Stabilizers: Electronic image stabilizers operate to electronically translate or rotate a video image responsive to processed video signals detected in a video camera. Disadvantageously, because of the computational intensity of the requisite signal processing, such systems often update too slowly for practical real-time use and may be suitable only for software-based off-line processing of recorded video.

Kinugasa et al. [Kinugasa et al., "Electronic Image Stabilizer for Video Camera Use," *IEEE Transactions on Consumer Electronics*, Vol. 36, No 3, August 1990], describe a method for horizontally or vertically moving a lens block only in response to image feature edge signal detections in the camera video signal. In effect, pan and tilt sensing are both located in camera video microprocessor. Disadvantageously, Kinugasa et al. achieved a stabilization rate of only 1 Hz and lens only control offers only a limited range of correction.

Murray et al. [Murray et al., "Motion Tracking with an Active Camera," *IEEE Transactions on Pattern Analysis and Machine Analysis*, Vol. 16, No. 5, May 1994], describe a method for processing a video image sequence "using motion detection techniques requiring the detection and interpretation of feature edge motion from successive video frames. Murray et al. characterize the work as "methods of tracking a moving object in real time with a pan/tilt camera" but suggest no mechanical stabilization or control techniques.

In U.S. Pat. No. 6,002,431, Jung et al. disclose a digital image stabilization technique that pixel-shifts image frames electronically to create a more stable video image in a camcorder. There are no mechanical features to this technique. Similarly, in U.S. Pat. No. 5,253,071, MacKay discloses an all-electronic method and apparatus for determining the position of an image projected onto an oversized HDTV image sensor inside a video camera. Neither Jung et al. nor MacKay suggest any active mechanical stabilization techniques.

Gyro Sensor Stabilization: The camera stabilization art is replete with gyro sensor stabilized camera system proposals that rely on an integral three-axis gyro sensor to measure platform tilt, pan and roll from a single location coupled to the camera platform. Disadvantageously, the gyro sensor configuration used universally in the art collocates the three rotation sensors in a single package, which introduces several problems. Each sensor's sensitivity to rotation about a stationary axis varies according to the pivot rotation position about another axis. For example, the sensitivity of a yaw rate sensor mounted directly on the camera platform decreases from maximum to null as platform pitch angle increases from zero to 90 degrees. Also, at large pitch angles, the pitched yaw sensor introduces orthogonal rotation components into the signal used to control yaw motion. Practitioners in the art are keenly aware of this problem and have proposed various "band-aids" such as adding relative position encoders and gravity-level sensors and adding complex sine-cosine coordinate transformations to maintain constant control loop gain in the stabilizer control circuitry. As another example of these disadvantages, the usual closed-loop servo control systems are easily destabilized by mechanical resonances arising from mechanical decoupling and separation of the sensors from their respective actuators. Until now, practitioners generally have attempted to ease this problem by using mechanically stiff (heavy) gimbaled frames that are not suitable for lightweight, handheld stabilizers, which require lightweight frames that are unavoidably flexible.

For example, in U.S. Pat. No. 6,611,662, Grober discloses an autonomous, stabilized platform embodiment including an integral rate-sensor package for determining rotation rate about three perpendicular axes. The three angular rate sensors are collocated in a common package on the camera head base to determine the motion of, for example, the vehicle on which the stabilized platform is mounted. A high resolution encoder is attached to each actuator motor and feeds back the position of the camera support platform relative to the sensors on the head base. A second multi-axis sensor package, containing level sensors is fixed to the camera support platform. Because Grober does not provide means for aligning the camera mass centroid with the stabilizer system pitch and roll axes of rotation, large high-torque motors are required, which is very disadvantageous in light or maneuverable handheld embodiments. In fact, the most portable embodiment suggested by Grober is a heavy, stiff strapped-on operator rig. For example, Perfect Horizon offers a 2-axis commercial camera stabilization head for marine applications that weighs 27 pounds and measures 18×18×7½ inches, essentially as described in U.S. Pat. No. 6,718,130, also issued to Grober. Grober neither considers nor suggests changes to the angular rate sensor disposition to eliminate the disadvantageous angular interaction problem.

As another example, in U.S. Pat. No. 4,989,466, Goodman discloses a three-axis stabilized platform using servo motors driven by gyro rate sensors mounted on a common platform in a single "gyrostabilizer assembly." Goodman notes that the roll and pitch signals disadvantageously interact as a function of pan angle, obliging him to add additional complexity to compensate for the fact that the sensors do not remain aligned with their respective actuators. Goodman employs a complex coordinate transformation technique where he applies the position sensor signals to a resolver and slip ring assembly where they are resolved through the pan angle into a coordinate system fixed with respect to the (camera) platform. Disadvantageously, while this transformation may fix the coordinates with respect to the platform, it does nothing to improve the poor sensor resolution near the unity sine/cosine angles. Goodman also suggests a fixed configuration that locates the (camera) platform mass centroid at the intersection of the three motor driven axes to eliminate unwanted torquing moments as a result of vehicle accelerations. Goodman neither considers nor suggests changes to the angular rate sensor disposition to eliminate the disadvantageous angular interaction problem.

As yet another example, in U.S. Pat. No. 6,263,160, Lewis discloses yet another three-axis stabilized platform for imaging devices such as cinematographic and video cameras. Lewis employs three magnetic torque motors, an angular rate sensor embodied as a fiber optic gyro, and a capacitive angle-sensor array. The angular rate sensor array is collocated in a single package attached to the platform to detect rates of rotation in three dimensions relative to inertial coordinates. The capacitive angle sensors are deployed to sense the angular displacement between the base and the platform in three dimensions. Once again, the additional angle sensors employed by Lewis in his control system are required to address the same disadvantageous angular interaction problem described by Goodman above. Lewis neither considers nor suggests changes to the angular rate sensor disposition to eliminate the disadvantageous angular interaction problem.

Gyro Stabilized Airborne Systems: The military and aerospace camera stabilization art is also replete with gyro sensor stabilized camera system proposals that rely on an integral three-axis gyro sensor to measure platform tilt, pan and roll from a single position coupled to the camera platform. But these proposals tend to be much more expensive because of specialized environmental requirements and are generally ill-suited for application to mechanically-stabilized handheld stabilizer systems using lightweight, flexible frames.

For example, in U.S. Pat. No. 4,520,973, Clark et al. disclose a stabilized gimbal platform employing rate gyro stabilized gimbal rings for military infrared missile targeting systems. A bail gimbal is used with both pitch and yaw inner gimbals to provide low friction stabilization over a large angular pointing range. The bail itself is not mounted on its axis of rotation but rather is off-axis mounted on bearings for support and driven by an off-axis torque motor drive. One or two single-axis gyro rate sensors mounted together on a common platform may be used but Clark et al. neither consider nor suggest the use of a plurality of angular rate sensors distributed and individually fixed to their respective gimbals. Clark et al. neither consider nor suggest application of their military techniques to inexpensive handheld stabilizer systems using lightweight, flexible frames.

As another example, in U.S. Pat. No. 6,542,181, Houska, et al. disclose an aerial video camera system for installation on an airplane, including a video camera and recorder with an internal stabilization system. Houska, et al. teach that all high-performance aerial video camera systems require effective vibration compensation to eliminate the effects of high-frequency airplane and wind vibrations for smooth, jitter-free operation; that the current state of the art for effective compensation is possible only through the use of some form of gyro-stabilization, usually for the camera mount; and that gyro-stabilization is complex and expensive, with complete systems often costing more than the airplane itself. Houska, et al. teaches the use of a foam sleeve to isolate the camera from high frequency airplane vibration.

As yet another example, in U.S. Pat. No. 5,897,223, Tritchew et al. discloses a three-axis stabilized platform including three magnetic torque motors and three orthogonal gyroscopes attached to a camera platform. Tritchew et al. suggest embodying the triple-gyro as an array of three fiber-optic gyros, but their control system embodiment also includes an inclinometer and an incremental shaft encoder capable of measuring only relative angle. The additional sensors and control system elements may be an attempt to overcome the same disadvantageous angular interaction problem described by Goodman above. Moreover, Tritchew et al. also include an outer sprung-shell vibration isolator to minimize the stabilization range required of their control system. Tritchew et al. neither consider nor suggest changes to the angular rate sensor disposition to eliminate the disadvantageous angular interaction problem. The Tritchew et al. patent is assigned to Wescam, who offer at http://www.wescam.com a number of stabilized, multi-spectral airborne imaging systems.

Commercial examples include Gyron Systems International, Ltd., http://www.gyron.com, offers a Dual Sensor Gimbal turret and camera, which measures 30×35×28 inches, for mounting outside of a helicopter. A two-channel fiber optic gyro package is used to stabilize the pan and tilt axes while the roll axis is stabilized by a quartz angular rate sensor. The outer pan and tilt gimbals are driven by direct-drive torque motors without gearing. The inner pan and tilt gimbals are driven by voice-coil actuators without gearing, to eliminate gear wear problems. The roll axis is driven by a torque motor driving through a ladder-chain. The angular rate sensors are grouped together on a common platform, as is universally done in the art, leading to the disadvantageous angular interaction problem described above. Gyron literature neither considers nor suggests application of their aeronautical techniques to mechanically-stabilized handheld stabilizer systems using lightweight, flexible frames.

Other commercial examples include Tyler Camera Systems, who offer side and nose mounted stabilized helicopter camera mounts for film and video formats at http://www.tylermount.com. They engineer and manufacture of custom stabilization platforms and appear to use the Kenyon Labs spinning flywheels described above in their Gyro-Stabilized Mounts for Helicopters" product line illustrated on their web site.

As a final commercial example, Crossbow Technology, http://www.xbow.com, is a supplier of inertial sensor systems for aviation, land, and marine applications, and markets its products for antenna and camera stabilization. A Crossbow vertical gyro or VG (VG400/VG700) system is strapped down to the aircraft and supplies roll and pitch data to the active gimbal. The gimbal uses the roll, pitch data and the gimbal's azimuth location relative to the aircraft in order to hold the camera at a constant angle relative to the horizon. Jitter reduction is simply measuring the activity of the camera and applying corrective signals to the motors in order to reduce the jitter. An IMU that measures rotation rate alone is typically used because no absolute position information is required. In digital video applications, jitter can be removed without the use of motors but sophisticated signal processing and rate/accelerometer data from an IMU. In the jitter reduction application, the Crossbow inertial system is mounted on the gimbal and frequently on the camera itself. Placing the sensor on the camera allows the controller to do closed loop control around a zero rate (null) sensor reading. In other words the sensor is actually measuring the error signal for the controller. The VG400 is found in many camera and antennae pointing systems. It uses MEMS technology, and it is the smallest of the above products. It reports roll, pitch information as well as 3-axes of angular rate data. The MEMS sensors are grouped together on a common platform, as is universally done in the art, leading to the disadvantageous angular interaction problem described above. Crossbow Technology literature neither considers nor suggests changes to the angular rate sensor disposition to eliminate the disadvantageous angular interaction problem.

As may be readily appreciated from these examples, the individual consumer selecting a camera platform stabilization system is limited to a variety of heavy, stiff commercial systems of moderate to high cost that require several heavy flywheel gyros each requiring a heavy power-pack or battery for spin-up. Because the military can afford the very high costs of more sophisticated systems, a military user may select from a broader range of devices employing very expensive and elaborate stabilization control systems in exchange for lower weight and power consumption. None of the available camera platform stabilization systems known in the art are suitable for applications requiring low cost, lightweight and low power consumption.

There is accordingly a clearly felt need in the art for a relatively inexpensive handheld camera stabilization system that is lightweight and flexible (maneuverable), stable over a wide range of angular positions and jitter frequencies (to DC). Such a stabilization system should also be suitable for smoothly simulating any desired camera motion responsive to a simple motion control signal transferred to the stabilizer controller. These unresolved problems and deficiencies are clearly felt in the art and are solved by this invention in the manner described below.

SUMMARY OF THE INVENTION

The system of this invention solves the above problems by eliminating the well-known gyro sensor stabilization angular interaction problem for the first time without additional sensors or heavy flywheels. According to this invention, each gyro sensor is rigidly fixed at a corresponding pivot axis, thereby isolating the sensor from the effects of motion about the other pivot axes. This invention results in part from the unexpectedly advantageous observation that the usual requirement for additional level sensors and/or relative position sensors is eliminated by the particular location and coupling of the angular rate sensors according to this invention.

The system of this invention needs no flywheels because the reaction forces needed for stabilization are imposed directly onto the respective gimbal frame at the pivot axis, thereby isolating the stabilized platform from all operator motion down to DC. This invention also results from the unexpectedly advantageous observation that the particular location and coupling of the rotation sensors according to this invention facilitates constant control loop gain in each individual channel even when the stabilized platform is moved through large yaw and pitch displacements. This is possible only because each of the rotation sensors remains in fixed alignment with the respective rotation axis over the full 180 degree yaw and 180 degree pitch regions.

According to the system of this invention, collocating a sensor with its respective actuator motor and coupling them rigidly provides the necessary control loop stability at the higher loop gains needed for high closed-loop performance. These higher loop gains provide for the first time a degree of operator motion rejection at the stabilized camera that was unknown in the prior art.

It is a purpose of this invention to provide a handheld device for supporting and actively stabilizing a motion picture or video camera to allow the operator to smoothly manipulate camera motion to capture stable footage without producing jittery images commonly associated with handheld video.

It is a feature of this invention that the lightweight, handheld system eliminates the need for a harness and its inherent limited range of motion, giving the operator the necessary freedom to easily lift a stabilized camera from ground level to above the operator's head quickly and smoothly.

It is an advantage of this invention that the operator has complete control, fluid maneuverability and exceptional isolation of the camera from unwanted operator motion while negotiating around people and over objects and terrain.

It is another feature of this invention that the stabilization system permits the camera platform to be smoothly panned left to right or tilted up and down under manual or automated control to, for example, track a subject or, for example, simulate camera platform motion for cinematographic purposes.

It is another advantage of this invention that little electrical power is required because of the absence of heavy high-speed flywheels and a simple stabilization control loop. The stabilized platform centroid may be adjusted with respect of the pivot axes to permit the use of low-torque actuators requiring little power.

It is yet another feature of this invention that a long focal length still camera may be stabilized while simultaneously panning and shooting without the need for a tripod, which is especially useful in sports and wildlife photography, for example.

It is another feature of this invention that the stabilizer system may be directly mounted to a moving, floating or airborne vehicle, instead of being handheld, thereby providing more flexibility and lower cost than commercially available systems of comparable performance.

It is yet another feature of this invention that motion of the stabilized platform may be controlled to move an otherwise stationary video camera through a predetermined sequence of positions intended to simulate to a viewer the filming of a scene from the deck of a ship or from the seat of an automobile. Alternatively, the stabilized platform may be controlled to move a video camera mounted in a moving automobile through a predetermined sequence of positions intended to simulate to a viewer the filming of a scene from the deck of a ship, for example, where the actual automobile motion is cancelled and the simulated ship motion added.

In one aspect, the invention is a hand-held stabilization system including a base; a stabilized platform having a first frame rotatably coupled to the base on a first pivot axis with a first actuator disposed to torque the first frame about the first pivot axis responsive to a first motor signal and a first rotational sensor having a rotation-sensitive sensor axis and producing a first sensor signal representing the rotation of the first frame with respect to the base; and having a second frame rotatably coupled to the first frame on a second pivot axis, with a second actuator disposed to torque the second frame about the second pivot axis responsive to a first motor signal and a second rotational sensor having a rotation-sensitive sensor axis and producing a second sensor signal representing the rotation of the second frame with respect to the first frame; further including at least one handle adapted for grasping by a human operator to facilitate moving the hand-held stabilization system about during operation; and a controller for producing each of the motor signal plurality responsive to a respective one of the sensor signal plurality, whereby the stabilized platform is disposed in a predetermined position independent of the position of the base.

In another aspect, the invention is a mobile stabilization system including a base; a stabilized platform having a first frame rotatably coupled to the base on a first pivot axis with a first actuator disposed to torque the first frame about the first pivot axis responsive to a first motor signal and a first rotational sensor having a rotation-sensitive sensor axis and producing a first sensor signal representing the rotation of the first frame with respect to the base; and having a second frame rotatably coupled to the first frame on a second pivot axis with a second actuator disposed to torque the second frame about the second pivot axis responsive to a first motor signal and a second rotational sensor having a rotation-sensitive sensor axis and producing a second sensor signal representing the rotation of the second frame with respect to the first frame; further including a mounting assembly adapted for fixing the mobile stabilization system to a vehicle to facilitate moving the mobile stabilization system about during operation; and a controller for producing each of the motor signal plurality responsive to a respective one of the sensor signal plurality, whereby the stabilized platform is disposed in a predetermined position independent of the position of the base.

The foregoing, together with other objects, features and advantages of this invention, can be better appreciated with reference to the following specification, claims and the accompanying drawing.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein:

FIG. 3A is a close-up front view of the yaw and pitch pivot assemblies from the system of FIG. 1 showing the yaw actuator with collocated rigidly-coupled yaw rotation sensor and the pitch actuator with collocated rigidly-coupled pitch sensor;

FIG. 3B is a close-up front view of an alternative embodiment of the yaw pivot assembly of FIG. 3A showing the yaw actuator with a nearly collocated rigidly-coupled yaw rotation sensor;

FIG. 3C is a close-up front view of an alternative embodiment of the yaw pivot assembly of FIG. 3A showing the yaw actuator with a raised collocated rigidly-coupled yaw rotation sensor;

DETAILED DESCRIPTION OF THE EMBODIMENTS

Figure 1:
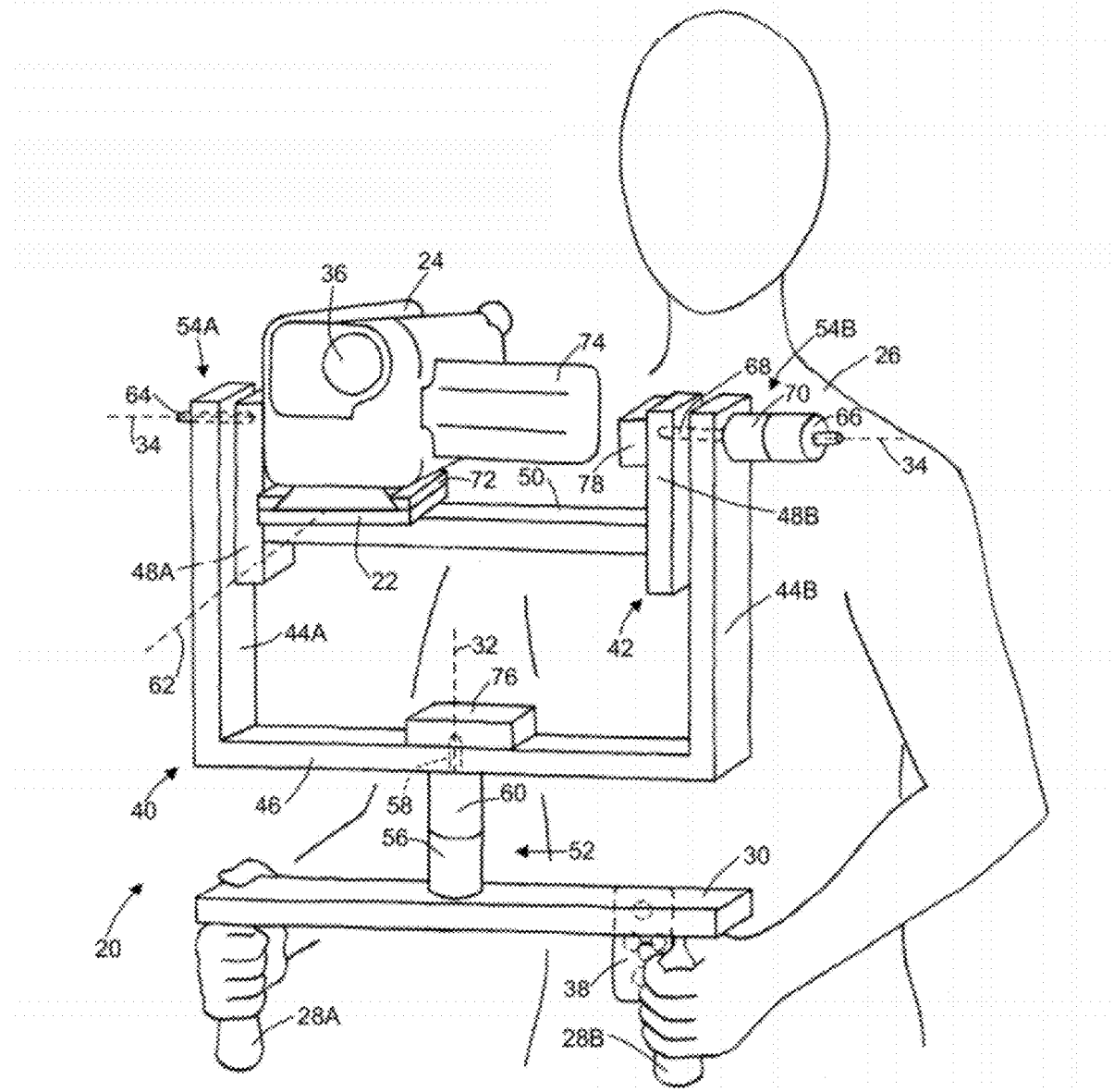
FIG. 1 is a perspective view of an exemplary embodiment of the lightweight, hand-held, yaw-and-pitch gimbaled stabilization system of this invention.

FIG. 1 illustrates an exemplary camera stabilization system embodiment 20 that stabilizes a platform 22 adapted to support and stabilize, e.g., a camera 24 against all yaw and pitch motion induced by the operator 26 through, e.g., a pair of handles 28A-B attached to a base 30. System 20 provides two orthogonal rotational degrees of freedom about a yaw axis 32 and a pitch axis 34. These degrees of freedom correspond respectively to panning and tilting of camera 24 at platform 22, which together define a center of mass (not shown), also herein denominated centroid or mass centroid. FIG. 1 depicts camera 24 with the camera lens 36 directed generally level and forward. However, system 20 allows panning and/or tilting of camera 24 through a range of over 180 degrees with full stabilization at any orientation. For example, camera lens 36 may be tilted to face vertically upward or nearly vertically downward and may be panned from side to side and around to the rear on either side. As used herein, slew and slewing denominates rotation or moving about an axis generally; panning denominates slewing in a generally horizontal direction about a generally vertical axis, and tilting denominates slewing in a generally vertical direction about a generally horizontal axis.

In operation, operator 26 supports system 20 without the need for a harness by grasping handles 28 mounted to base 30. A control panel 38 is fixed to base 30 adjacent either of handles 28 to allow operator 26 to manually operate switches (not shown) on panel 38 to pan and tilt platform 22 and the attached camera 24. System 20 operates to hold platform 22 and camera 24 stable in the two-dimensional space defined about axes 32-34, independent of any pan or tilt motion at base 30, but camera 24 may be panned or tilted by operation of control panel 38.

System 20 provides a gimbal support structure that includes a U-shaped yaw frame 40 and a U-shaped pitch frame 42 substantially as shown. Yaw frame 40 includes the two arms 44A-B joined by a bottom element 46. Pitch frame 42 includes the two arms 48A-B joined by a bottom element 50. Yaw frame 40 is rotatably secured about yaw axis 32 at bottom portion 46 to base 30 by means of a yaw pivot assembly 52. Similarly, pitch frame 42 is rotatably secured about pitch axis 34 at arms 48A-B to yaw frame 40 by means of a pitch pivot assembly 54A-B substantially as shown. Yaw frame 40 and pitch frame 42 may be integrally formed or assembled from pieces with fasteners such as screws. It may be readily appreciated that platform 22 is an illustrative embodiment of the platform element of this invention and that, alternatively, the camera base 72, bottom element 50 of pitch frame 42, or any other suitable element rigidly mounted thereto may embody the platform element of this invention.

Pivot assembly 52 includes a yaw servo motor 56 (also herein denominated a pivot actuator) fixed to base 30 with internal bearings (not shown) for radially and axially supporting a motor shaft 58, which is fixed to yaw frame 40. Yaw motor 56 operates to produce torque (rotational force) about yaw axis 32 and may also incorporate a gear head 60 or similar speed-reduction mechanism. Unless the operator significantly tilts base 30 about a third roll axis 62, the weight of the yaw frame and camera produces only a small moment on yaw motor shaft 58 so that shaft 58 alone is sufficiently strong to support the combined weight of camera 36, pitch frame 42 and yaw frame 40. Yaw motor shaft 58 is rigidly secured to yaw frame bottom element 46 by one or more setscrews (not shown) threaded into the side of element 46 or by any other useful means so that shaft 58 cannot inadvertently slip out of or rotate inside yaw frame bottom element 46.

The two elements of pivot assembly 54A-B include an anti-friction rotational support axle 64 fixed to couple one side (arms 44A and 48A) of frames 40-42 substantially as shown and a pitch servo motor 66 (also herein denominated a pivot actuator) fixed to the opposite yaw frame arm 44B with internal bearings (not shown) for radially and axially supporting a motor shaft 68, which is fixed to pitch frame arm 48B to rotate on pitch axis 34 collinear with rotational support axle 64 substantially as shown. Pitch motor 66 operates to produce torque (rotational force) about pitch axis 34 and may also incorporate a gear head 70 or similar speed-reduction mechanism. Anti-friction rotational support axle 64 may be embodied using any useful elements known in the art, such as an axle and a duplex ball bearing, for example, or a bearing cartridge, or an axle or hollow tube supported by one or more ball bearings mounted on the yaw frame, on the pitch frame or both, for example.

Pitch motor 66 is fixed horizontally on or through yaw frame arm 44B. Pitch motor shaft 68 and its corresponding axle 64 each penetrate opposing pitch frame arms 48B-A through machined holes substantially as shown. Shaft 68 and axle 64 are secured in position by one or more setscrews (not shown) threaded into the sides of pitch frame arms 48A-B or by any useful means known in the art so that neither shaft 68 nor axle 64 can inadvertently slip out of or rotate inside pitch frame arms 48A-B. To avoid interference, yaw frame arms 44A-B should be made long enough to permit clearance between camera 24 and bottom yaw frame element 46 when camera 24 is pitched fully upward or fully downward.

In system embodiment 20, pitch frame 42 is supported by pivot assembly 54A-B on two sides at shaft 68 and axle 64 instead of, for example, on one side at shaft 68 alone, thereby minimizing the cantilever stress on pitch frame 42. Also, the moment produced on pitch motor shaft bearing (not shown) and pitch gear head 70 is greatly reduced, resulting in a significant extension of its lifetime of low friction operation.

A camera stage 72 may be fixed to or formed as an integral part of platform 22. A cinematographic, video or still camera 24 is secured to camera stage 72 by means of any conventional quick-release plate and latch, as further illustrated in FIGS. 5B and 5C.

Pitch frame bottom element 50 must be long enough to accommodate the width of both the main body of camera 24 and its flip-out camera monitor 74. In some applications, a remote monitor may be used, eliminating any need for accommodating camera monitor 74 on pitch frame 42. Under such circumstances, a substantially more compact embodiment that accommodates only the body of camera 36 is preferable. With camera monitor 74, camera 24 is preferably located near 54A on the side opposite pitch servo motor 66 (at 54B). This helps to balance yaw frame 40 on yaw axis 32 by moving the center of mass or gravity (C.G.) or mass centroid of the combination of camera 24 and pitch frame 42 closer to the geometrical center of yaw frame 40. However, this step alone may be insufficient to relocate the centroid at yaw axis 32 through yaw pivot assembly 52, which is the preferred location.

Moreover, to significantly reduce gravitational torque loads on pitch motor actuator 66, the centroid of platform 22, camera 24, camera stage 72 and pitch frame 42 should be disposed on pitch axis 34 through pitch pivot assembly 54A-B. Aligning the centroid of the stabilized elements with the pivot assembly axes (see FIG. 4 described below) significantly conserves battery power and reduces actuator heating, especially when the camera platform is oriented strongly up or down.

Pivot assemblies 52 and 54A-B each include a rotation-sensitive sensor for producing a signal representing the motion of the supported structure about the respective pivot axis. Yaw pivot assembly 52 includes a yaw rotation sensor 76 fixed to yaw frame element 46. Yaw sensor 76 has a single rotation-sensitive axis (not shown) that is oriented with yaw axis 32 in system embodiment 20 so that yaw sensor 76 produces an electronic signal (not shown) that represents the rotation of yaw frame 40 about yaw axis 32. Because yaw sensor 76 is fixed to yaw frame 40, and yaw frame 40 is fixed to yaw pivot assembly 52, the orientation of the rotation-sensitive sensor axis (not shown) of yaw sensor 76 is fixed with respect to yaw axis 32 at all orientations of platform 22 and at all positions of pitch frame 42. Similarly, pitch pivot assembly 54A-B includes a pitch rotation sensor 78 fixed to pitch frame arm 48B near pitch motor shaft 68. Pitch sensor 78 has a single rotation-sensitive axis (not shown) that is oriented with pitch axis 34 in system embodiment 20 so that pitch sensor 78 produces an electronic signal (not shown) that represents the rotation of pitch frame 42 about pitch axis 34. Because pitch sensor 78 is fixed to pitch frame 42, and pitch frame 42 is fixed to pitch pivot assembly 54A-B, the orientation of the rotation-sensitive sensor axis (not shown) of pitch sensor 78 is fixed with respect to pitch axis 34 at all orientations of platform 22 and at all positions of yaw frame 40.

It is an important element of the system of this invention that the signal from yaw sensor 76 is directly related to the absolute rotation of yaw frame 40, and therefore to the actual yaw rotation of pitch frame 42. This is made possible for the first time by the system of this invention, exemplified by embodiment 20 in which yaw sensor 76 is mounted on top of yaw frame element 46 closely proximate yaw axis 32 through yaw shaft 58. Yaw sensor 76 is also rigidly coupled to yaw shaft 58, which is important for the purposes of the system of this invention. While the rotation-sensitive axis of yaw sensor 76 is preferably also aligned with yaw axis 32, this is not essential as long as the relative orientation of the two axes is always held the same. This sensor disposition and coupling allows yaw sensor 76 to directly sense yaw frame rotation without attenuation by changes in the angle of pitch frame 42. Because yaw sensor 76 is disposed at yaw motor shaft 58 instead of on stabilized platform 22, the yaw sensor signal is insensitive to the pitch (and roll) angle of camera 24.

A yaw sensor mounted on the stabilized camera platform, as is commonly practiced in the art, becomes increasingly sensitive to camera roll by a sine relationship and increasingly insensitive to camera yaw by a cosine relationship as camera pitch angle deviates from zero at the horizontal. At large camera pitch angles, a camera platform yaw sensor responds mainly to roll about roll axis 62 instead of yaw about yaw axis 32. Such disposition of the yaw angular rate sensor on the camera platform is disadvantageous because the effective gain of the yaw control loop would decrease at high pitch angles to the point where stabilization is lost. This is the problem known for conventional inertial platform type sensing arrangements using three orthogonal gyro sensors in one package fixed to the stabilized payload or platform, which is known to require very complex control systems with additional relative position sensors and embedded sine-cosine transformations to at least partially decouple the several sensor signals. Additionally, because yaw sensor 76 in system 20 disposed proximate yaw motor shaft 58, local mechanical feedback is available for yaw servo motor 56 so that even a high degree of mechanical flexibility in a lightweight embodiment of yaw and pitch frames 40-42 requires no more than the relatively simple yaw control loop described herein below.

It is another important element of the system of this invention that the signal from pitch sensor 78 is directly related to the absolute rotation of pitch frame 42, and therefore to the actual pitch rotation of stabilized platform 22 and camera 24. This is made possible for the first time by the system of this invention, exemplified by embodiment 20 in which pitch sensor 78 is mounted on pitch frame arm 48B closely proximate pitch axis 34 through pitch shaft 68. Pitch sensor 78 is also rigidly coupled to pitch shaft 68, which is important for the purposes of the system of this invention. While the rotation-sensitive axis of pitch sensor 78 is preferably also aligned with pitch axis 34, this is not essential as long as the relative orientation of the two axes is always held the same. This sensor disposition and coupling allows pitch sensor 78 to directly sense pitch frame rotation without attenuation by changes in the angle of yaw frame 40 or changes in roll orientation about roll axis 62. Because pitch sensor 78 is disposed at pitch motor shaft 68 instead of on stabilized platform 22, the pitch sensor signal is insensitive to the roll and yaw angles of camera 24.

Each of stabilized axes of rotation in system 20 requires an independent closed-loop control system or channel as is described herein below with reference to FIG. 8. For example, yaw stabilization is achieved by feeding back the yaw motion sensor's output to the yaw motor, and pitch stabilization is achieved by feeding back the pitch motion sensor's output to the pitch motor. Interaction between these two control systems is also reduced significantly because the stabilized axes are orthogonal to each other.

Pitch and yaw frames 40-42 and base 30 are important structural elements of system 20 and are preferably composed of a high-strength, lightweight, well-damped, shatter-resistant material such as aluminum or polycarbonate Lexan®, which is resistant to breaking or shattering under load and during fabrication. As discussed below in connection with FIG. 8, well-damped frame materials enhance the closed-loop stability and performance of the rig's stabilization control systems. These frames may have rectangular or other cross sections, which permit lightweight and retain rigidity.

Figure 2A:
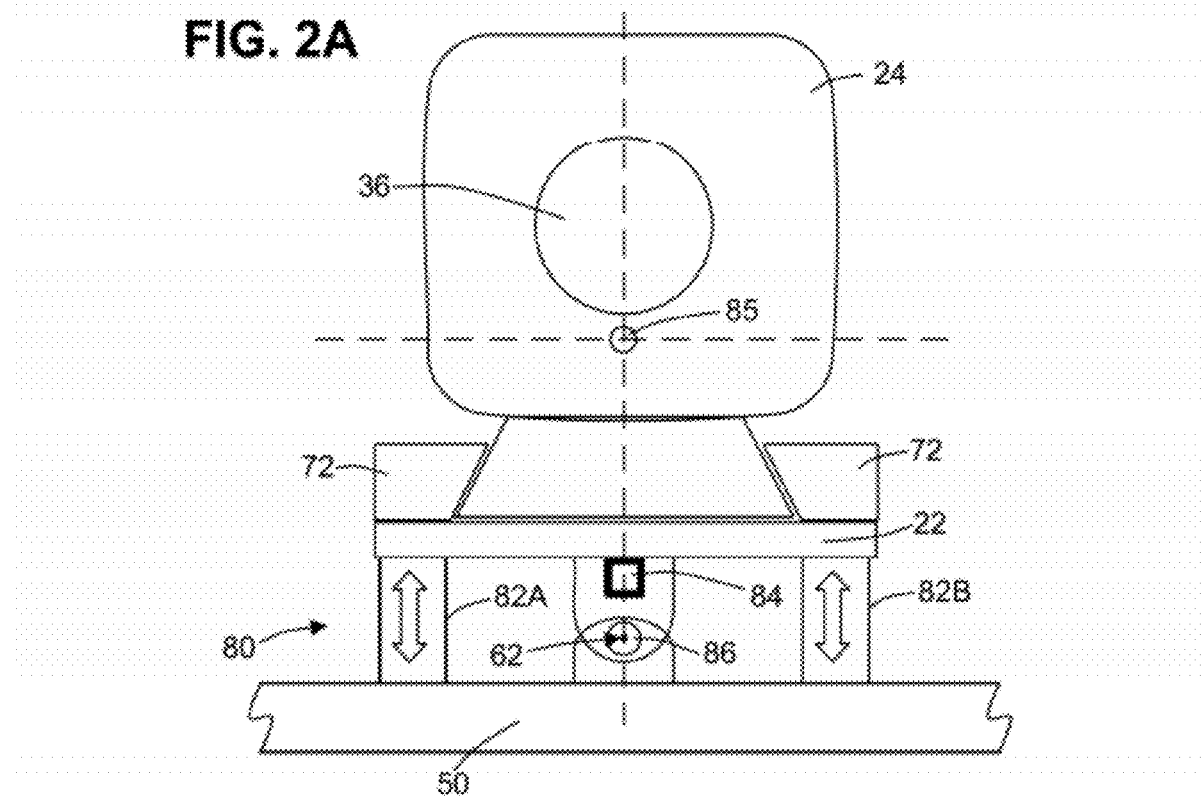
FIGS. 2A-B are front views of the alternative roll pivot assembly of this invention showing the roll axis seesaw actuator and the collocated rigidly-coupled roll sensor.

While very useful and advantageous, system 20 in FIG. 1 includes no means for stabilizing platform 22 and camera 24 about roll axis 62. However, system 20 may be adapted for three-axis stabilization and several exemplary adaptations are now described. For example, instead of fixing platform 22 directly to pitch frame bottom element 50, platform 20 may be coupled to element 50 by means of the roll pivot assembly 80 as illustrated in FIG. 2A. Roll pivot assembly 80 includes a roll axis seesaw actuator 82A-B, a collocated roll sensor 84 (which is rigidly coupled to stabilized platform 22) and a central roll axle 86 oriented with roll axis 62. Operating in cooperation with a third independent control channel (not shown), roll pivot assembly 80 stabilizes platform 22 and camera 24 against operator-induced rotation of base 30 (FIG. 1) about roll axis 62. In FIG. 2A, roll actuator 82A-B operates in a seesaw manner to rotate platform 22 about roll axis 62 on roll axle 86 to stabilize platform 22 with respect to the horizon and to isolate it from any erratic roll motion from the operator by way of handles 28A-B (FIG. 1). Preferably, roll axle 86 is disposed directly under the centroid 85 of the fully loaded platform 22 to minimize gravitational torque on roll pivot assembly 80. As camera 24 is usually oriented with the horizon, camera roll axis stabilization typically requires no more than ±15 degree motion about roll axis 62 at platform 22 to compensate for operator unsteadiness. Roll actuator 82A-B may be embodied as, for example, a pair of linear actuators or solenoids pivotally coupled to each side of platform 22 with provision for travel sufficient for a ±15 degree range of motion about roll axis 62. Collocated roll sensor 84 is fixed to platform 22 to sense camera roll and provide stabilizing feedback to roll actuators 82A-B by way of an independent roll stabilization control loop (not shown). It may be readily appreciated that roll sensor 84 may also detect a platform yaw rotation component at high platform pitch angles. However, upon yaw stabilization by yaw motor 56 at high platform pitch angles, roll actuator 82A-B operates to stabilize platform 22 against roll motion in the direction camera 24 is pointed; thereby canceling the same small platform yaw rotation component and effectively operating as a second "yaw stabilizer" piggybacked on yaw motor 56 to further stabilize platform 22 (supporting camera 24) against any remaining operator-induced yaw motion. Also, because roll sensor 84 is directly coupled to the roll axis actuator 82A-B, there is no variation in roll axis control loop gain when the rig's pitch or yaw angles are varied.

Figure 2B:
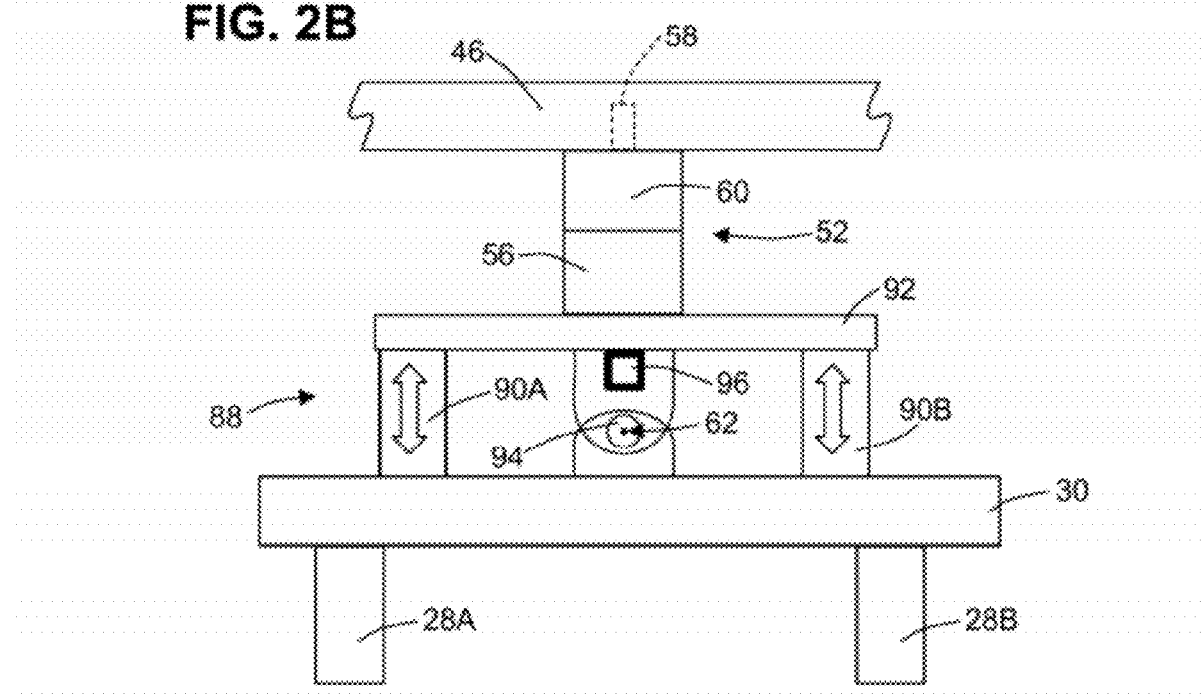

Alternatively, instead of fixing yaw pivot assembly 52 directly to base 30, yaw motor 56 may be coupled to base 30 by means of the roll pivot assembly 88 shown in FIG. 2B. The seesaw configuration seen in FIG. 2A is also useful here to isolate system 20 from the operator's erratic roll motion. In FIG. 2B, the roll actuator 90A-B operates to rotate a support element 92 about roll axis 62 on a roll axle 94 to stabilize yaw motor 56 (and, thereby, platform 22) with respect to the horizon and to isolate it from any erratic roll motion from the operator by way of handles 28A-B (FIG. 1). Preferably, roll axle 94 is disposed directly under the centroid (not shown) of the fully-loaded support element 92 (encompassing most of system 20) to minimize gravitational torque on roll pivot assembly 80. The larger mass supported by roll pivot assembly embodiment 88 suggests that roll pivot assembly embodiment 80 in FIG. 2A is preferable thereto. As camera 24 is usually oriented with the horizon, camera roll axis stabilization typically requires no more than ±15 degree motion about roll axis 62 at element 92 to compensate for operator unsteadiness. Roll actuator 90A-B may be embodied as, for example, a pair of linear actuators or solenoids pivotally coupled to each side of platform 22 with provision for travel sufficient for a ±15 degree range of motion about roll axis 62. The collocated roll sensor 96 is fixed to support element 92 to sense its roll and to provide stabilizing feedback to roll actuators 90A-B by way of an independent roll stabilization control loop or channel (not shown). It may be readily appreciated that in this alternative embodiment for roll axis stabilization, all three control axes remain largely orthogonal to one another at all times, given the very limited angular displacement of roll actuator 90A-B.

It should be apparent in view of these teachings that any useful actuator configuration known in the art, exemplified by a pair of differentially operating linear actuators or solenoids, disposed to impart rotation to the camera or the handle frame over a limited range, may be used to achieve roll stabilization in system 20.

FIG. 3A is a close-up front view of yaw pivot assembly 52 and pitch pivot assembly 54B from FIG. 1 showing yaw actuator 56 with collocated rigidly-coupled yaw rotation sensor 76 and pitch actuator 66 with collocated rigidly-coupled pitch sensor 78. FIG. 3A illustrates the preferred placement of the rotation-sensitive yaw sensor axis 98 close or coincident to the rotation axis of to yaw motor shaft 58 and the preferred disposition of the rotation-sensitive pitch sensor axis 100 close or coincident to the axis of rotation of pitch motor shaft 68. There is a rigid mechanical coupling between each sensor and its respective motor shaft.

FIG. 3B is a close-up front view of an alternative pivot assembly embodiment 102 showing the actuator 104 with a rigidly-coupled rotation sensor 106 having a rotation-sensitive sensor axis 108 that is close to but not coincident to the axis of rotation 110 of the pivot motor shaft 112. Preferably, to most accurately determine the true rotational motion of the stabilized platform, rotational sensors should be disposed as close to the associated rotational axis as possible. Especially for gyro sensors that are not completely insensitive to translational motion, the gyro sensor should be disposed close to the associated rotation axis to minimize tangential motion effects at the gyro sensor output and be less sensitive to flexing of the rotationally supported frame FIG. 3C is a close-up front view of another alternative pivot assembly embodiment 114 showing actuator 116 with a rigidly-coupled yaw rotation sensor 118 that is raised by the rigid sensor support 120 above the mounting surface in the direction of the rotation-sensitive sensor axis 122, which is coincident to the axis of rotation of the pivot motor shaft 124. It may be readily appreciated that the teachings of FIGS. 3B and 3C apply to any stabilized axis.

Because the handheld system of this invention and its pitch and yaw frames must be lightweight, they are unavoidably flexible and will bend slightly as the actuators torque them to accelerate the relatively large inertial load of the stabilized camera platform. If the motion sensors are mounted directly to the stabilized camera stage, they must signal the spurious oscillations of the inertial camera stage mass resulting from the excitation of the complex spring-mass mechanical system. High control gains are ordinarily not feasible in loops with significant mechanical flexibility in the structure between the point of actuation and the point of feedback sensing, which is the situation when the sensor and actuator are not collocated. According to the system of this invention, collocating a sensor with its respective actuator motor and coupling them rigidly provides the necessary control loop stability at the higher loop gains needed for high closed-loop performance. These higher loop gains provide for the first time a degree of operator motion rejection at the stabilized camera that was unknown in the prior art.

Even if the motion sensor is not perfectly centered over the rotational axis of the motor (e.g., FIG. 3B) much of the control loop stability benefits of local feedback sensing may still be available if there is rigid coupling between the sensor and the motor shaft. For example, FIG. 2A illustrates an acceptable compromise disposition for roll sensor 84, which is rigidly coupled to the mechanical load but not precisely located over the rotational axis of roll axle 86. FIG. 3C illustrates a situation where the motion sensor is located directly in line with the motor's rotational axis, but elevated above the motor's mechanical load to achieve some mechanical clearance. As long as the sensor supports are relatively rigid, the sensor is effectively collocated with the motor.

However, simply placing the motion sensor on the motor's rotational axis alone does not ensure acceptable system performance. For example, referring to FIG. 1, placing pitch sensor 78 on pitch frame arm 48A over or near axle 64 on the opposite side of platform 22 from pitch motor 66 at pitch frame arm 48AB does not achieve the collocated sensor performance of this invention because of the effects of the flexible mechanical elements between the motion sensor at 54A and the motor at 54B. For the same reasons, the placement of two or three gyro sensors together in a single package fixed to the stabilized platform or portions connected to it, without relative position sensors and other control system complexity, in a system with lightweight or mechanically flexible gimbal frames results in unacceptable performance, as is well-known.

Figure 4:
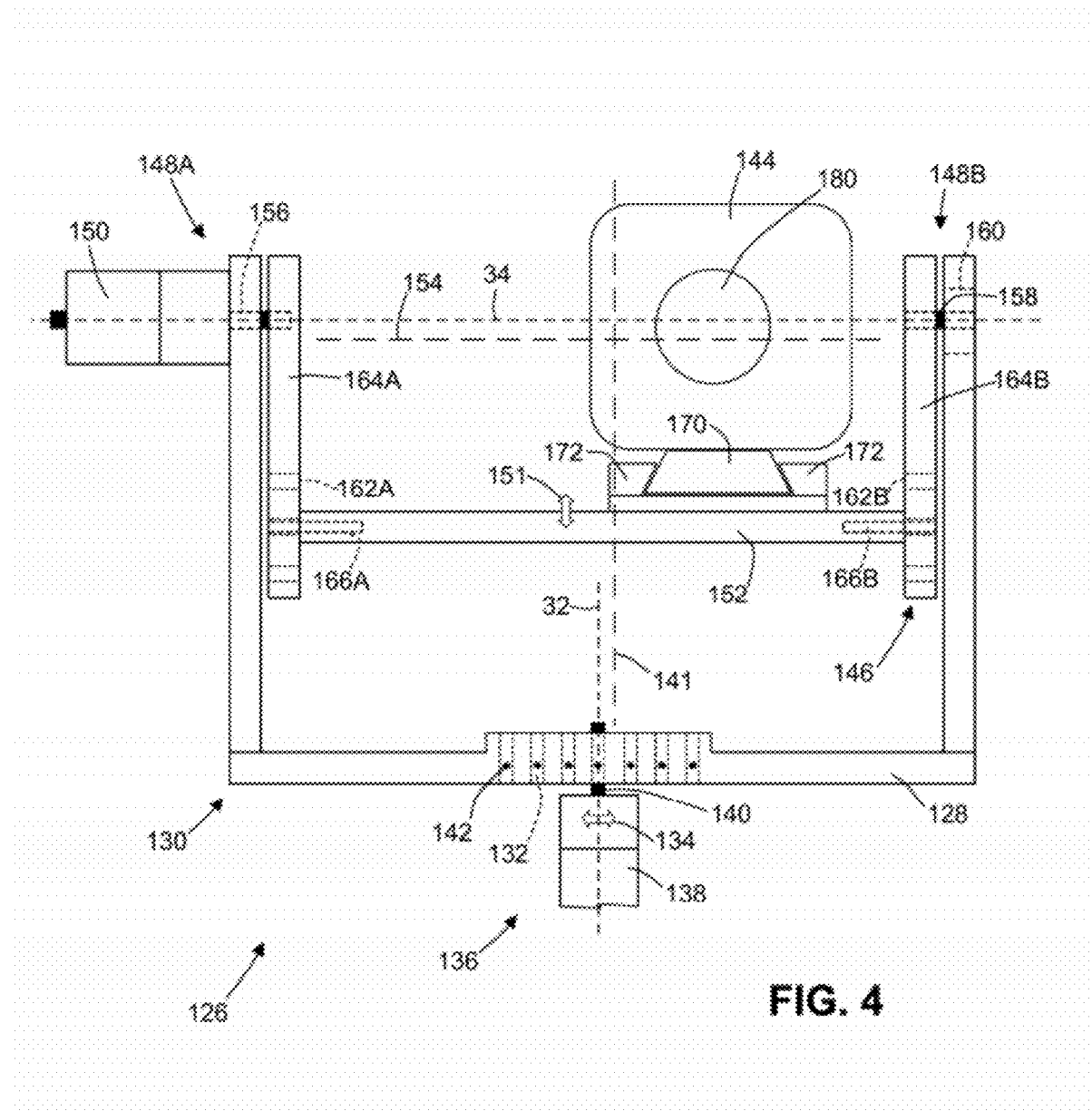
FIG. 4 is a front view of a preferred embodiment of the stabilized system of this invention showing mounting features disposed to allow realignment of the rotational axes of the pitch and yaw pivot assemblies with respect to the mass centroid (center of mass) of the respective supported structures.

FIG. 4 is a front view of a preferred camera stabilization system embodiment 126 showing mounting features disposed to allow realignment of the stabilized camera platform centroid (center of mass) with respect to the rotational axes of the pitch and/or yaw actuators. The central region of the bottom element 128 of the U-shaped yaw frame 130 includes a plurality of spaced machined yaw centroid location holes, exemplified by the yaw centroid location hole 132, distributed along the yaw centroid adjustment direction indicated by the arrows 134. Yaw frame 130 is rotatably supported by the yaw pivot assembly 136, including the yaw motor 138, and the yaw motor shaft 140. During adjustment, yaw motor shaft 140 is inserted into a selected yaw centroid location hole and is secured by at least one intersecting setscrew threaded into one of the plurality of threaded setscrew holes exemplified by the threaded setscrew hole 142 intersecting yaw centroid location hole 132. The central region of the bottom element 128 should be thickened to provide extra strength and stiffness that may be necessary to rigidly secure shaft 140 into bottom element 128 at the large pitch angle values arising when yaw frame 130 may be pitched downward away from the operator.

Preferably, the rotational axis of yaw motor shaft 140 is aligned with the yaw centroid 141 of the structure supported thereby, which is not usually precisely aligned with the geometrical center of yaw frame 130 alone. Practically, yaw motor shaft 140 is inserted into the yaw centroid location hole that permits the entire supported structure, including the camera 144, the pitch frame 146, the pitch pivot assembly 148A-B, the pitch motor 150 and yaw frame 130 to roughly balance on yaw motor shaft 140. This can be tested by first extending the camera monitor, if available, to its open position and then observing how well yaw frame 130 balances on yaw motor shaft 140 when held at a slight downward angle. If yaw frame 130 tilts downward to the right, for example, yaw motor shaft 140 must be shifted to the right-adjacent yaw centroid location hole (i.e., in the same direction) and so forth.

In a handheld stabilization system using portable battery power, it is important to conserve electrical energy. Therefore, an important feature of the system of this invention is the capacity to realign the rotational axes with respect to the centroid of the respective driven assembly. This capacity permits the stabilized platform to accommodate different cameras having different masses, geometries and centroids. Thusly minimizing the average torque requirement at each pivot assembly serves to minimize the current and power demands of the actuator motors during operation. This is especially valuable when the camera platform is stabilized at large tilt angles in up or down orientation. If, for example, the camera and pitch frame assembly's center of mass was far below its rotational axis, the pitch motor would have to continuously supply significant torque just to overcome gravitational forces. A battery power supply would be drained rapidly if required to supply a significant continuous current to the motor to provide this holding torque, and the motor would have to dissipate considerable heat.

Referring to FIG. 4, system 126 may be adjusted to reduce electrical power consumed by the pitch servo motor 150 when holding camera 144 in an extreme pitched orientation by adjusting the height of the pitch frame bottom element 152 according to this invention. For minimum power consumption, bottom element 152 should be disposed so that the pitch centroid 154 (center of mass) of the combined distributed mass of camera 144 and pitch frame 146 is aligned with pitch rotation axis 34 defined by the pitch motor shaft 156 and the anti-friction rotational support axle 158 retained by the ball bearing assembly 160 in pitch pivot assembly 148A-B. However, pitch centroid 154 is preferably disposed just sufficiently below the actual position of pitch rotation axis 34 to ensure that camera 144 is not tending to flip over when power is removed from system 126. This disposition may be adjusted in the pitch centroid adjustment direction indicated by the arrows 151. Thus, according to this invention, pitch frame element 152 is disposed to align with the uppermost pair of platform height location holes, exemplified by the height location hole pair 162A-B, at which camera 144 remains stable in pitch with changes in the pitch angle of yaw frame 130. Pitch servo motor 150 then requires relatively little electrical power to stabilize camera 144 even when oriented at substantially upward or downward pitch angles. Pitch frame bottom element 152 is then rigidly secured to the two pitch frame arms 164A-B by means of the two through-bolts 166A-B substantially as shown.

Figure 5A:
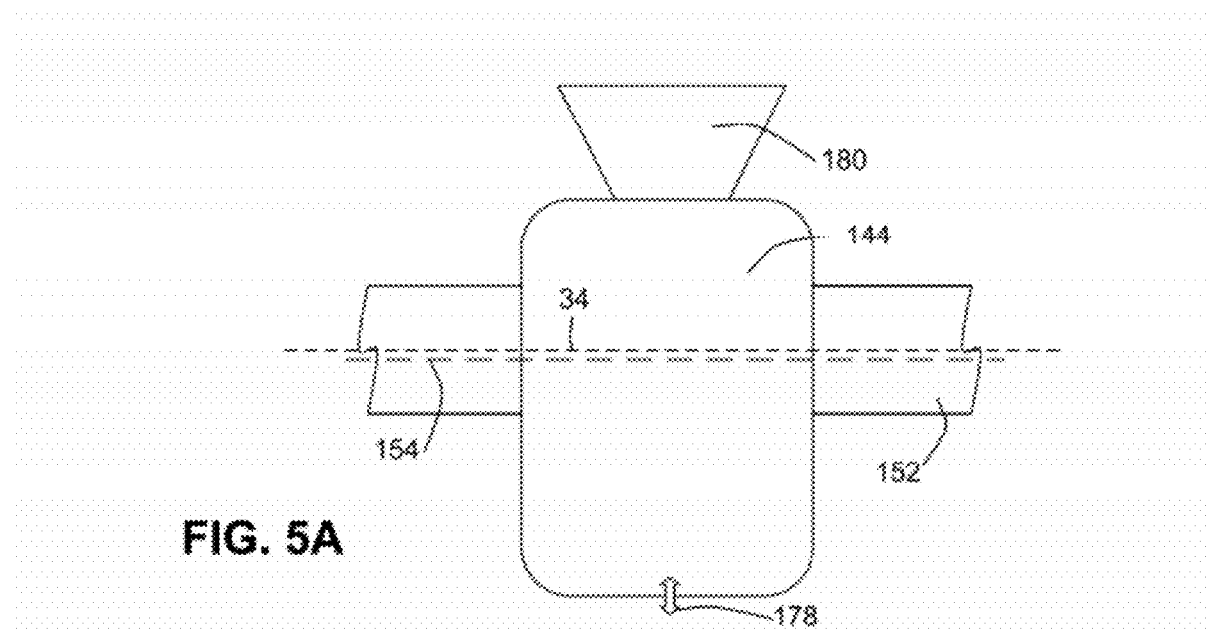
FIG. 5A is a top view of the stabilized camera of FIG. 4.
Figure 5B:
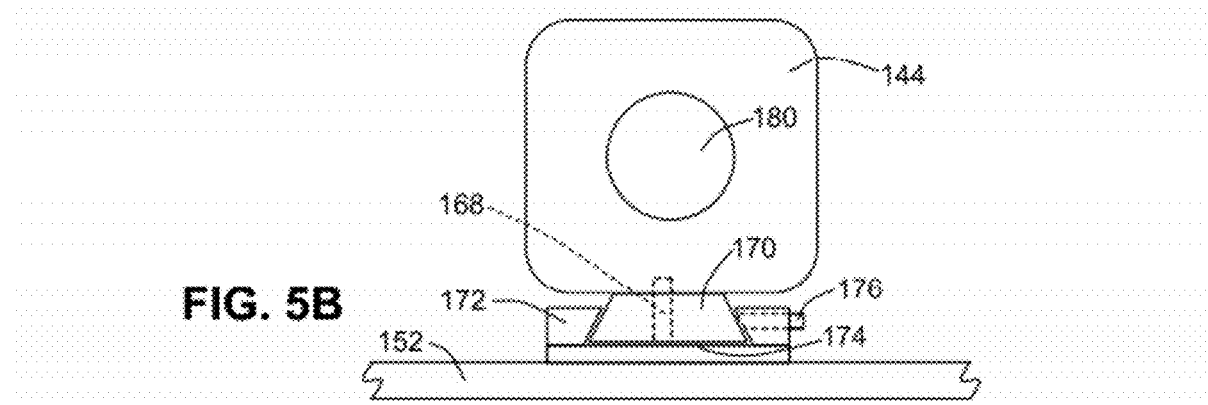
FIG. 5B is a front view of the stabilized camera and platform of FIG. 4 showing a quick release plate whose depth may be adjusted relative to the camera stage for depth mass centroid realignment purposes.
Figure 5C:
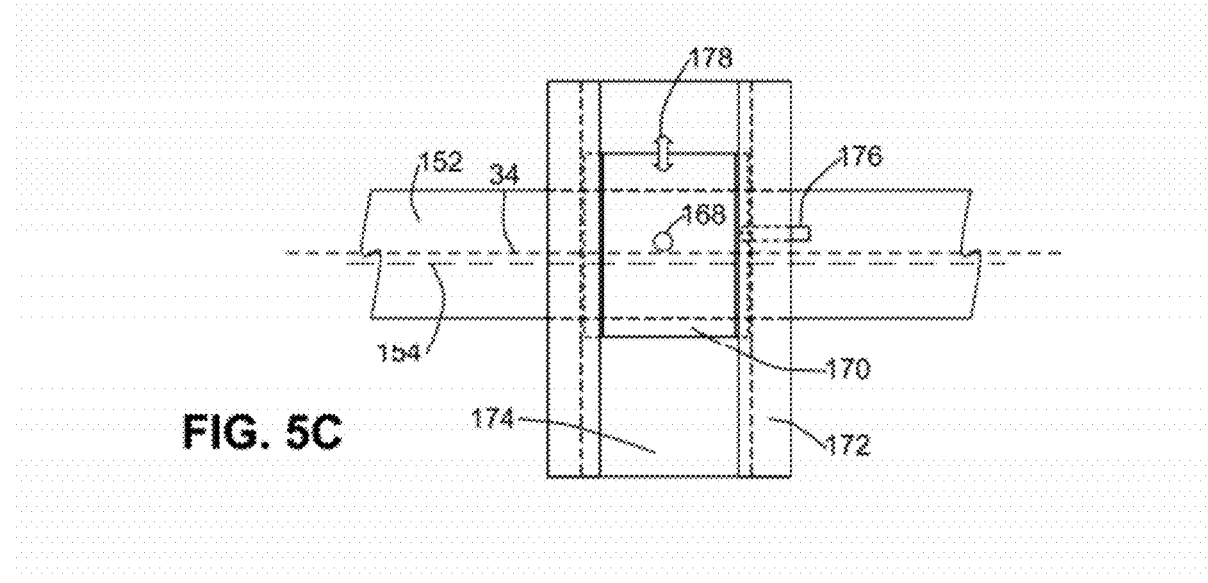
FIG. 5C is a top view of the stabilized platform of FIG. 4 showing the adjustable-depth quick release plate.

FIG. 5A is a top view of camera 144 from FIG. 4 showing pitch frame bottom element 152 aligned with pitch centroid 154 of the structure supported by pitch pivot assembly 148A-B (FIG. 4). FIG. 5B is a front view of camera 144 shown fixed by a camera mounting screw 168 to a quick release plate 170 that is slidably retained in a camera stage 172 by a chamfered channel 174 and a locking tab 176. The disposition of quick release plate 170 may be adjusted in the centroid depth adjustment direction indicated by the arrows 178, within channel 174 to reposition the depth of camera 144 along the centroid depth adjustment direction 178. FIG. 5C is a top view of camera stage 172, without camera, illustrating quick release plate 170 in more detail.

Because camera 144 and pitch frame 146 are relatively free to rotate about pitch rotation axis 34 on pitch pivot assembly 148A-B with pitch servo motor 150 unpowered, the operator may easily adjust camera depth and height to align the centroid of the camera and pitch frame assembly elements as close as desired to the rotation axis of pitch pivot assembly 148A-B. The camera depth redisposition may be accomplished by observing the pitch or tilt imposed by gravity on camera 144. If the centroid of camera 144 is too far forward, the camera lens 180 may be observed to point downward, and if centroid of camera 144 is too far backward, the camera lens 180 may be observed to point upward. By releasing and sliding quick release plate 170 with camera 144 along the centroid depth adjustment direction indicated by arrows 178, the desired balance may be achieved by iteration; that is, observe gravity tilt, release and adjust camera depth, fix camera and repeat. Quick release plate 170 is finally secured tightly to camera stage 172 by means of locking tab 176 in the conventional manner. The resultant balanced configuration minimizes electrical power consumption by pitch motor 150 during operation.

This centroid depth adjustment procedure, in combination with the pitch centroid height adjustment procedure discussed above in connection with FIG. 4, provides for realignment of the centroid of the distributed camera and pitch frame assembly elements anywhere in the plane defined by yaw rotational axis 32 and centroid depth adjustment direction 178, thereby permitting centroid realignment through the rotation axis of pitch pivot assembly 148A-B while also facilitating physical clearance between bulky camera geometries and nearby system elements. Similarly, this centroid depth adjustment, in combination with the yaw centroid adjustment procedure discussed above in connection with FIG. 4, provides for realignment of the centroid of the distributed camera and yaw/pitch frame assembly elements anywhere in the plane defined by pitch rotation axis 34 and centroid depth adjustment direction 178, thereby permitting centroid realignment through the rotation axis of yaw pivot assembly 136 while also facilitating physical clearance between bulky camera geometries and nearby system elements. Preferably, the rotation axes of yaw pivot assembly 136 and pitch pivot assembly 148A-B are disposed on a plane orthogonal to roll axis 62 when the centroid adjustments are made so that the three centroid adjustment procedures may generally obtain the desired alignments, and this may be accomplished by holding the camera substantially horizontal and level while making centroid adjustments.

It may be readily appreciated that customized or camera-specific stabilization systems may be fabricated according to these teachings. Such systems may be tailored specifically to a single camera embodiment and thereby provide a lower-cost, more compact stabilization system specific to a single camera product with optimal motor sizes and no platform height adjustment requirements.

Figure 6A:
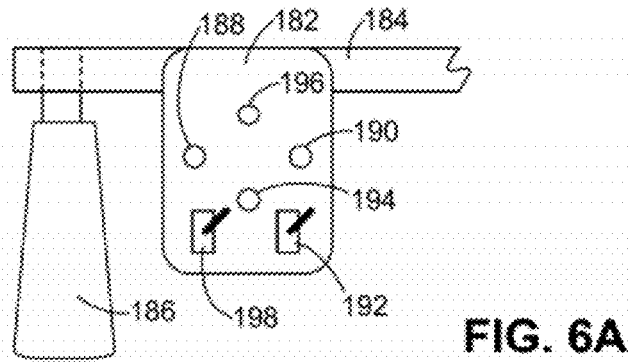
FIG. 6A is a front detail view of an exemplary embodiment of the manual control panel of the stabilization system of this invention.

FIG. 6A is a front detail view of an exemplary manual control panel embodiment 182 suitable for use with the stabilization system of this invention. Because the stabilization system of this invention operates to hold the stabilized camera platform in a fixed spatial orientation, an operator slew control panel facilitates reorientation of the camera platform, to follow a subject or any other purpose. As shown for control panel 38 in FIG. 1, control panel 182 is fixed to the base 184 close to a handle 186 to permit the operator (not shown) to operate the controls with the thumb while also holding handle 186 in the hand. This disposition may be on either the right or left (illustrated) side of base 184. The operator may thereby slew the stabilized camera platform (not shown) about by means of mechanical switches while carrying the system. For example, control panel 182 includes a yaw-left pushbutton 188, a yaw-right pushbutton 190 and a multiposition yaw rate selector switch 192, which together permit the smooth panning of the stabilized platform (not shown) to any direction desired. Similarly, control panel 182 includes a pitch-down pushbutton 194, a pitch-up pushbutton 196 and a multiposition pitch rate selector switch 198, which together permit the smooth tilting of the stabilized platform (not shown) to any direction desired. A set of roll pushbuttons or switches (not shown) may be added if roll stabilization is provided (e.g., FIG. 7). However, the utility of operator roll control is generally limited to leveling the camera. In operation, the operator depresses pitch-up pushbutton 196 to slew the camera in an upward direction and depresses pitch-down pushbutton 194 to slew the camera in an downward direction. Pitch rate selector switch 198 allows the operator to select a pitch slew rate from among two or more preselected speeds. The operator depresses yaw-left pushbutton 188 to slew the camera to the left and depresses the yaw-right pushbutton 190 to slew the camera to the right. Yaw rate selector switch 192 allows the operator to select a yaw slew rate from among two or more pre-selected speeds. Slewing occurs only when the operator depresses one of the pushbuttons in control panel 182. A schematic of the analog circuitry associated with control panel 182 is discussed below in connection with FIG. 11. A command board (not shown) may be mounted behind control panel 182 to support the necessary electronic components (not shown).

Figure 6B:
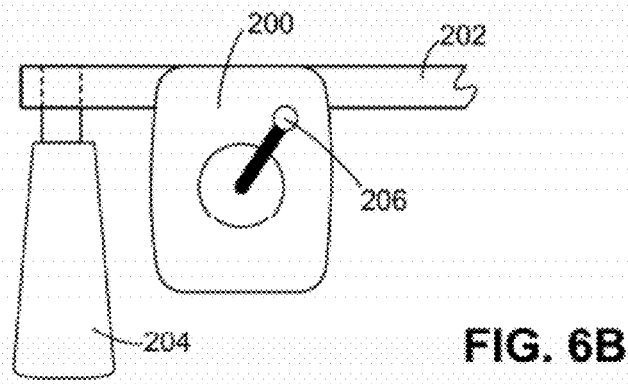
FIG. 6B is a front detail view of another exemplary embodiment of the manual control panel of the stabilization system of this invention.

FIG. 6B is a front detail view of another exemplary manual control panel embodiment 200 suitable for use with the stabilization system of this invention. Control panel 200 is fixed to the base 202 close to a handle 204 to permit the operator (not shown) to operate the controls with the thumb while also holding handle 204 in the hand. This disposition may be on either the right or left (illustrated) side of base 202. The operator may thereby slew the stabilized camera platform (not shown) about by means of a mechanical joystick 206 while carrying the system. Joystick 206 is preferably adapted to move the stabilized camera platform (not shown) in the direction in which joystick 206 is urged by the operator and with the speed indicated by the amount of operator displacement of joystick 206 in the usual manner, by, for example, producing appropriate signals for motion in both yaw and pitch.

Figure 6C:
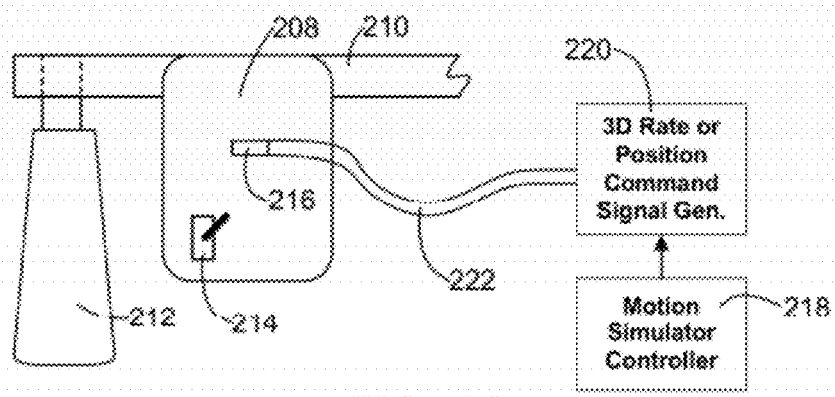
FIG. 6C is a block diagram illustrating an exemplary embodiment of the external slew signal interface panel of the motion simulator system of this invention.

FIG. 6C is a block diagram illustrating an exemplary embodiment of the external slew signal interface panel 208 of the motion simulator system of this invention discussed below in connection with FIG. 15. For convenience, interface panel 208 is fixed to the base 210 close to a handle 212 to permit the operator (not shown) to operate the interface controls with the thumb while also holding handle 212 in the hand. This disposition may be on either the right or left (illustrated) side of base 210. The operator may thereby activate and deactivate the motion simulation feature of the stabilized camera platform (not shown) by means of a mechanical toggle switch 214 while carrying the system. Operation of the motion simulation system of this invention is the same as the operation of stabilization platform 20 (FIG. 1) except the slewing of the stabilized platform 22 (FIG. 1) is controlled by the signals accepted at the signal input terminal 216 from an external motion controller 218 instead of the signals produced by operation of local mechanical switches described above in connection with FIGS. 6A-B. For example, a desired rolling motion intended to simulate a video camera on board an ocean-going vessel may be recorded and stored as digital data within controller 218 for later use. These data may then be transmitted to a three-dimensional rate or position command signal generator 220 that is programmed to customize the roll, pitch and yaw control signals 222 to the characteristics required for proper operation of the motion simulator system supported by base 210. Signals 222 are coupled to signal input terminal 216 by any useful means, such as, for example, wireless data transfer means or an electrical signal cable substantially as shown. Operation of mechanical toggle switch 214 may enable and disable the acceptance of signals 222 and, for example, may also produce signals to generator 220 or controller 218 for various useful purposes.

Figure 7:
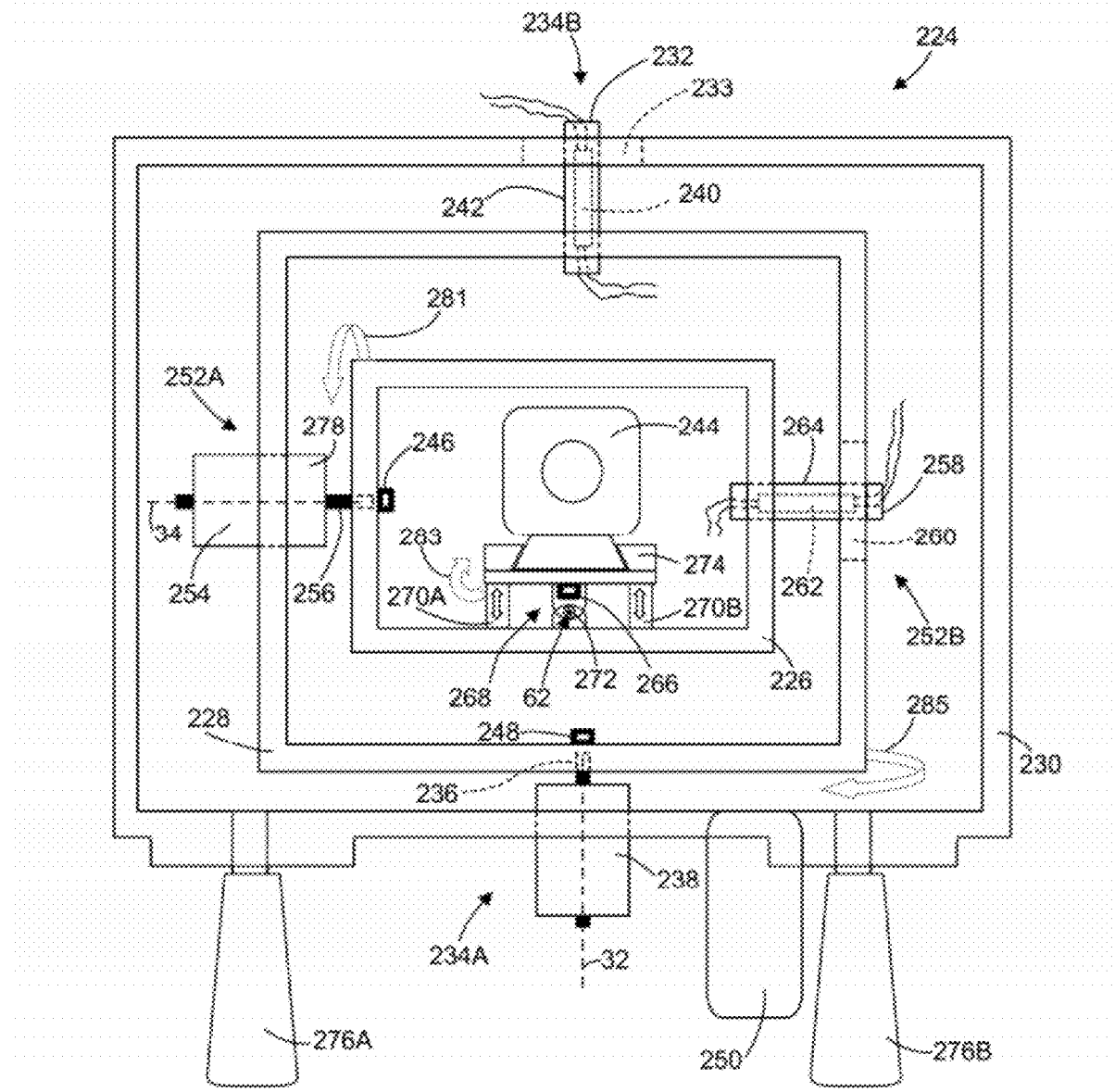
FIG. 7 is a front view of an alternative embodiment of the handheld yaw, pitch and roll gimbaled stabilization system of this invention employing continuous gimbal frames and slip-ring pivot assemblies.

FIG. 7 is a front view of an alternative stabilization system embodiment 224 of this invention. To stiffen the U-shaped gimbal frames discussed above in connection with FIGS. 1-6, the U-shaped structure may be extended into a closed O-shaped or rectangular-shaped structure exemplified by the pitch frame 226, the yaw frame 228 and the base frame 230 shown in FIG. 7. Base frame 230 is embodied as a closed O-shaped structure so that an anti-friction rotational support axle 232 may be supported in base frame 230 by a bearing assembly 233 to better support yaw frame 228 on the upper side as part of the yaw pivot assembly 234A-B that also includes the collinearly-disposed yaw motor shaft 236 supported by the yaw actuator motor 238 disposed below as before. Rotatably supporting yaw frame 228 on two sides in this manner also permits the addition of a second actuator motor (not shown) at 234B for purposes of reducing the size and weight of each motor or improving mass distribution uniformity, for example. Rotational support axle 232 may be embodied to include an internal slip ring assembly 240 within a hollow shaft 242 to facilitate conduction of electrical power and signals between base frame 230 and yaw frame 228. Slip ring assembly 240 facilitates the transfer of electrical signals and power between the several electrical elements of yaw frame 228 and base frame 230. For example, signals may be transferred from the camera 244, the pitch rate gyro sensor 246 and the yaw rate gyro sensor 248, to the controller assembly 250 without external signal cables that may impress an orientation-dependent torque bias on yaw frame 228. Slip ring assembly 240 may be embodied as, for example, a miniature slip ring assembly, such as the H-series available from I.D.M. Electronics, Ltd. (U.K.). Alternatively, hollow shaft 242 may be employed as a simple conduit for passing connecting cables between gimbal frames 228-230.

Pitch frame 226 is rotatably supported on two sides within yaw frame 228 as before by means of the pitch pivot assembly 252A-B. Rotatably supporting pitch frame 226 on two sides also permits the addition of a second actuator motor (not shown) at 252B for purposes of reducing the size and weight of each motor or improving mass distribution uniformity, for example. At 252A, the pitch actuator motor 254 is fixed to yaw frame 228 and the pitch motor shaft 256 is fixed to pitch frame 226. At 252B, an anti-friction rotational support axle 258 is rotatably retained within yaw frame 228 by a bearing assembly 260. Rotational support axle 258 may be embodied to include an internal slip ring assembly 262 within a hollow shaft 264 to facilitate conduction of electrical power and signals between pitch frame 226 and yaw frame 228. Slip ring assembly 262 allows the transfer of electrical signals and power between yaw frame 228 and camera 244, the roll rate gyro sensor 266, and the roll pivot assembly 268 mounted on the inside of pitch frame 228 without external signal cables that may impress an orientation-dependent torque bias on pitch frame 226. Slip ring assembly 262 may be embodied as, for example, a miniature slip ring assembly, such as the H-series available from I.D.M. Electronics, Ltd. (U.K.). Alternatively, slip ring assembly 262 may be embodied as a larger diameter hollow slip ring assembly that concentrically encompasses an axle or motor shaft, or as a bearing cartridge assembly with an integral slip ring, for example. Alternatively, hollow shaft 264 may be employed as a simple conduit for passing connecting cables between gimbal frames 226-228.

Camera 244 is stabilized in roll by means of roll pivot assembly 268 as shown in FIG. 7 (see also FIG. 2A). Roll pivot assembly 268 includes a roll axis seesaw actuator 270A-B, a central roll axle 272 aligned with roll axis 62 and collocated roll sensor 266, which is rigidly coupled to the stabilized platform 274. Operating in cooperation with a third independent control channel (not shown) in controller assembly 250, roll pivot assembly 268 stabilizes platform 274 and camera 244 against operator-induced rotation of base frame 230 about roll axis 62. Controller assembly 250 may also include, for example, control panel 38, power amplifiers 296 or 356, and controller channels 280 or digital controller 354. Roll actuator 270A-B operates in a seesaw manner to rotate platform 274 about roll axis 62 on roll axle 272 to stabilize platform 274 with respect to the horizon and to isolate it from any erratic roll motion from the operator by way of the handles 276A-B. Preferably, roll axle 272 is disposed directly under the centroid of the fully-loaded platform 274 to minimize gravitational torque on roll pivot assembly 268. As camera 244 is usually oriented with the horizon, camera roll axis stabilization typically requires no more than ±15 degree motion about roll axis 62 at platform 274 to compensate for operator unsteadiness. Roll actuator 270A-B may be embodied as, for example, a pair of linear actuators or solenoids pivotally coupled to each side of platform 274 with provision for travel sufficient for a ±15 degree range of motion about roll axis 62. Collocated roll sensor 266 is fixed to platform 274 to sense camera roll and provide stabilizing feedback to roll actuators 270A-B by way of an independent roll stabilization control loop (not shown).

It may be readily appreciated that the actuator motor and shaft disposition may be reversed from the orientations shown in FIG. 7, so that the actuator motor body is coupled to the driven frame and the motor axle is coupled to the supporting frame, for example. In such situation (not shown), a rotation sensor would remain mounted to its (respective) driven frame, but rigidly coupled to the (respective) actuator motor body instead of the motor axle. However, such an arrangement (not shown) disadvantageously requires the wires supplying actuator motor power be carried through an additional rotating joint.

It may be readily appreciated that the hierarchy of the three pivot assemblies shown in FIG. 7 may be reordered without departing from the claimed invention. For example, the yaw pivot assembly may support the roll pivot assembly, which may in turn support the pitch pivot assembly.

It may also be readily appreciated that the stabilizer system of this invention may be directly mounted to a moving, floating or airborne vehicle without departing from the claimed invention.

Preferably, as shown in FIG. 7, yaw actuator motor 238 penetrates into or through the central portion of base frame 230 and is rigidly secured in place. Handles 276A-B are fixed at each end of base frame 230 substantially as shown. Base frame 230 should be thickened at these locations to better support handles 276A-B and yaw motor 238. Also as shown in FIG. 7, pitch servo motor 254 and the integral speed reduction gear head 278 penetrates through yaw frame 228. The inside dimension of yaw frame 228 should be made sufficiently (but not unnecessarily) wider than the outside dimension of pitch frame 230 to provide clearance between the frames that can accommodate any frame distortion experienced during operation. Yaw frame 228 may be embodied as an integral piece or as an assembly of rigidly fastened structural members (e.g., FIG. 1), for example.

Thus, as just described, stabilization system 224 in FIG. 7 operates to hold camera 244 on platform 274 rotationally stable in space in three dimensions independent of any movement of base frame 230 within the control range; stable in the yaw direction indicated by the yaw arrow 285 about yaw axis 32, stable in the pitch direction indicated by the pitch arrow 281 about pitch axis 34 and stable in the roll direction indicated by the roll arrow 283 about roll axis 62. The control range of system 224 is about ±180 degrees in pitch and yaw (assuming mechanical clearance of camera 244 within yaw frame 228) and ±15 degrees in roll.

Figure 8:
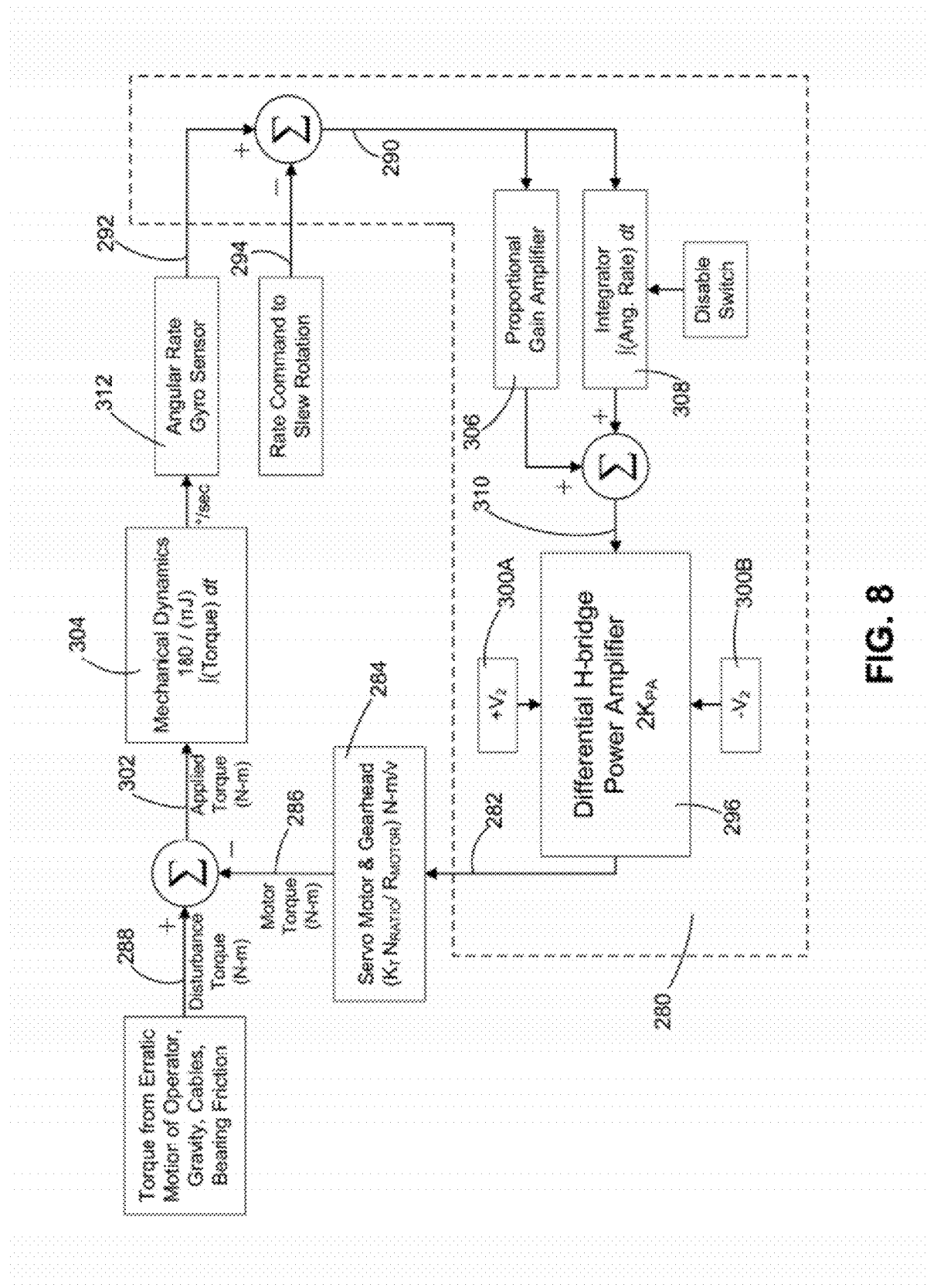
FIG. 8 is a schematic functional block diagram illustrating a single channel of a multichannel stabilization controller suitable for use in the stabilization systems of FIGS. 1 and 7.

FIG. 8 is a functional block diagram illustrating a single controller channel 280 from a multichannel controller embodiment suitable for use in stabilization systems 20 and 224 discussed above (FIGS. 1 and 7). Controller channel 280 is duplicated for each rotational direction in which the camera platform is stabilized; two directions in system 20 (FIG. 1) and three directions in system 224 (FIG. 7), for example. Controller channel 280 employs a conventional proportional-plus-integral feedback control scheme to produce the motor signal 282 needed to apply (by means of the associated actuator motor 284) to the associated gimbal frame (not shown) the mechanical torque 286 needed to cancel the associated net disturbance torque 288 arising from user motion and other causes. As shown in more detail in FIG. 10, controller channel 280 accepts the angular rate signal 290 representing a combination (e.g., the difference) of the associated sensor signal 292 and a slew command signal 294 and responsively produces motor signal 282 ($V_{MOTOR}$) from the linear differential H-bridge power amplifier 296, which is shown in more detail in FIG. 10. Power amplifier 296 has a gain of 2*$K_{PA}$ (nominally=10) because each of the two power amplifier stages 298A-B (FIG. 10) have gain magnitude $K_{PA}$ (nominally=5) and operate to drive the servo motor 284 differentially. Linear differential H-bridge power amplifier embodiment 296 may be replaced with a high-frequency switching pulse-width-modulated (PWM) H-bridge power amplifier (not shown), for example, without other changes.

The schematic functional representation of servo motor 284 and its associated gear-head includes the motor torque constant $K_T$, the effective gear ratio $N_{RATIO}$ and the motor coil resistance $R_{MOTOR}$. When using low ratio gear-heads, the back-EMF of motor 284 is unimportant because peak motor speeds in this application are generally very low. The maximum available motor torque 286 is determined not only by the available supply voltages 300A-B to power amplifier 296, etc., but also by $N_{RATIO}$. For example, a servo motor operating without a gear-head has an $N_{RATIO}$ of unity. For this reason, a gear-head, or other speed reducing apparatus, multiplies the available holding torque (by $N_{RATIO}$) for stabilizing an unbalanced camera platform load and also facilitates the use of a smaller, lighter and less powerful servo motor.

The applied torque 302 operates to accelerate the stabilized camera platform (not shown) about the rotation axis associated with single controller channel 280 and actuator motor 284. Applied torque 302 is the difference between motor torque 286 and disturbance torque 288, which arises from erratic operator motion, from gravity, from any hanging cables and from pivot assembly bearing friction. Disturbance torque 288 is the enemy of platform stabilization and must be exactly cancelled about the single associated rotation axis by operation of controller channel 280. Motor torque 286 in this closed-loop controller channel 280 is continuously adjusted to match and oppose disturbance torque 288 and thereby move angular rate signal 290 towards zero. The angular acceleration of the stabilized platform is attenuated by its moment of inertia, J, about the associated rotation axis. Thus, the overall loop gain of controller channel 280 depends on the dynamics 304 of the particular camera or other instrument coupled to the stabilized platform, which requires provision for adjustable gain in the proportional gain amplifier 306 and integrator 308 to allow loop gain trimming to compensate for changes in mechanical dynamics 304. The operation of proportional gain amplifier 306 and the integrator 308 is discussed below in connection with FIG. 10. The sum of outputs from these two stages is the control signal 310, which is furnished to power amplifier 296.

Slew command signal 294 is required to slew the stabilized platform about the associated axis because there is no other means for rotating the stabilized platform once controller channel 280 has attained equilibrium and the platform is stabilized. The magnitude and polarity of slew command signal 294 are determined by operation of the command board circuitry described below in connection with FIG. 11. Because slew command signal 294 subtracted from sensor (RateOut) signal 292 to produce angular rate signal 290 and because controller channel 280 operates to continuously move angular rate signal toward zero, the stabilized platform slews about the associated axis at a rate and in a direction determined by the particular level and polarity of slew command signal 294.

Figure 9:
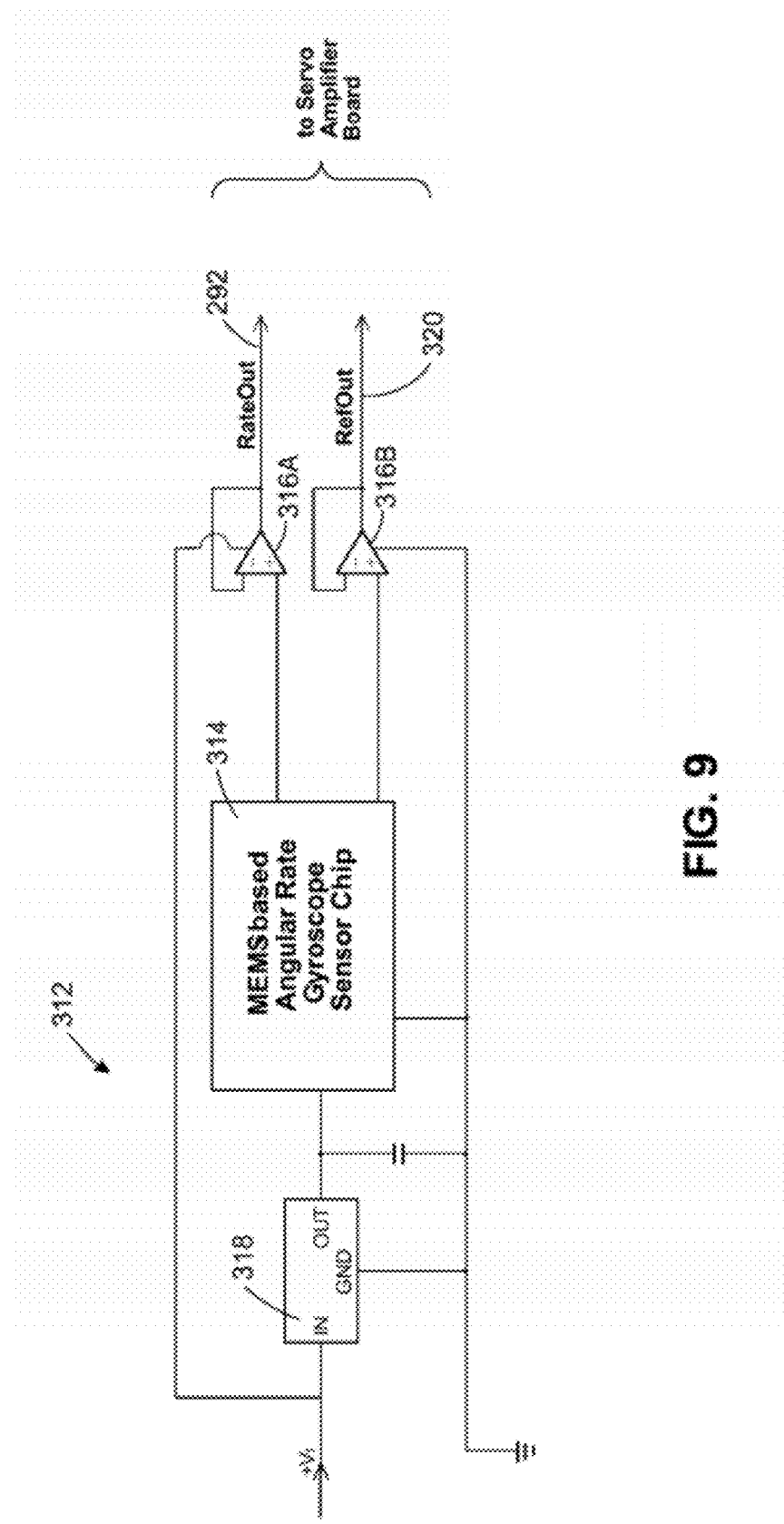
FIG. 9 is a schematic block diagram illustrating a rotation sensor embodiment using a Micro-Electro-Mechanical Systems (MEMS) angular rate gyroscope sensor chip and associated circuitry.

FIG. 9 is a schematic block diagram illustrating a rotation sensor embodiment 312 using a Micro-Electro-Mechanical Systems (MEMS) angular rate gyroscope sensor chip 314 with the associated analog buffer amplifiers 316A-B and a dedicated voltage regulator 318, which are preferably both disposed proximate to sensor chip 314 in a single physical package adapted for rigid coupling to the associated pivot assembly (e.g., sensor 76 in pivot assembly 52 of FIG. 1). Such a package should include MEMS sensor chip 314, dedicated regulator 318 embodied as a three-terminal +5-volt voltage regulator, and buffer amplifiers 316A-B embodied as two unity gain op-amps for isolating the MEMS chip drivers for sensor output signal 292 and a reference level output signal 320 from the impedance loading that may be imposed by a long shielded cable (not shown). Sensor signal 292 (RateOut) varies linearly with angular rate in the range from about 0.25 volts to about 4.75 volts, and is about 2.5 volts at zero rate. RateOut sensor signal 292 is referenced to the nominal +2.5 volt value of reference level output signal 320 (RefOut). However, RateOut sensor signal 292 swings above and below RefOut signal 320 in response to the bipolar angular rate (angular velocity) seen at MEMS chip 314. A +12 volt supply, $V_1$, is shown powering both voltage regulator 318 and buffer amplifiers 316A-B to ensure full voltage swing capability from buffer amplifiers 316A-B. The illustrated gyro board requires a four-conductor cable (not shown), which is preferably shielded to reduce switching circuit noise induction in embodiments employing PWM amplifiers, for example.

Figure 10:
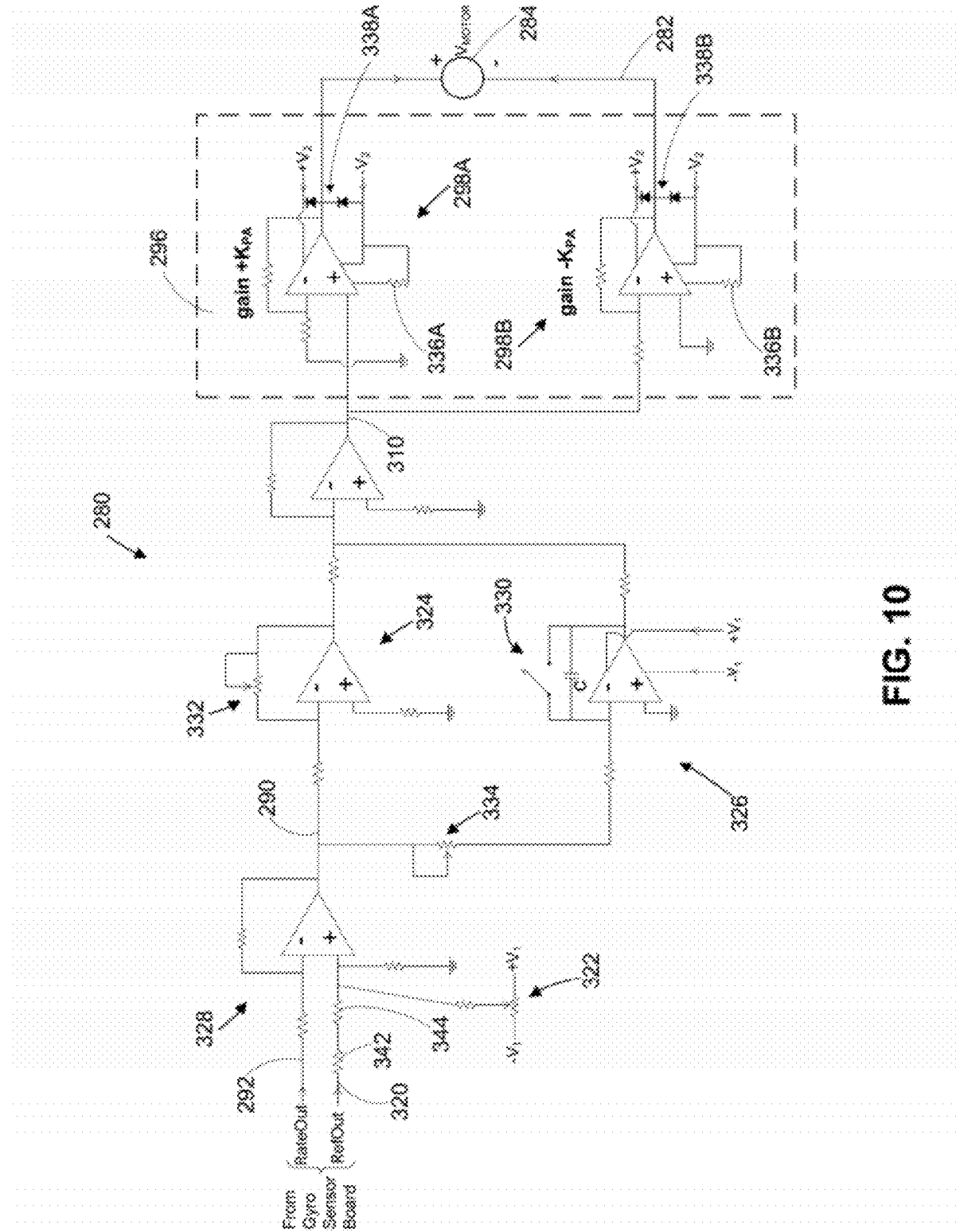
FIG. 10 is a schematic circuit diagram illustrating an exemplary analog embodiment of the controller channel of FIG. 8.

FIG. 10 is a schematic circuit diagram illustrating an exemplary analog embodiment of the controller channel 280 of FIG. 8. Controller channel 280 includes a gyro sensor offset null adjustment 322, an adjustable-gain proportional amplifier 324, an adjustable-gain integrator 326 and the detailed H-bridge configuration of power amplifier stages 298A-B. A difference amplifier 328 is coupled from gyro sensor 312 (FIG. 9) and compares sensor RateOut signal 292 and sensor RefOut signal 320 to minimize the effects on angular rate signal 290 (drift) arising from time and temperature variations in both sensor signals 292 and 320 and to eliminate the effects on angular rate signal 290 (offset) of any common-mode ground offset. Sensor offset null adjustment 322 operates to eliminate any remaining initial offset when adjusted to null (zero) angular rate signal 290 when the associated sensor is at rest. The operator can make this adjustment easily without tools by (a) enabling integrator 326 at the switch 330 and (b) turning adjustment 322 until zero slew is observed about the associated rotation axis.

Adjustable-gain proportional amplifier 324 operates to amplify angular rate signal 290 from difference amplifier 328. A potentiometer 332 in the feedback loop facilitates adjustment of the proportional-amplifier gain over the interval from 0 to 100. Proportional-amplifier gain adjustment may be accomplished by the operator by (a) first temporarily disabling integrator 326 at switch 330, (b) next increasing the proportional-amplifier gain at potentiometer 332 until a high-frequency oscillation (closed-loop instability) is observed, and (c) then reducing proportional-amplifier gain slightly below the oscillation quenching point to ensure stable operation. It is advantageous to maximize the gain in this manner, which achieves the maximal rejection of operator-induced disturbances. When integrator 326 is disabled, controller 280 causes actuator motor 284 to operate as a viscous damper or shock absorber between the stabilized camera platform and mechanical ground at the operator-supported handles (FIG. 1). Maximizing the gain in proportional amplifier 324 also maximizes this advantageous "viscous coupling," which desensitizes the stabilized camera platform from operator motion. Importantly, actuator motor 284 operates in a manner that isolates the operator from any sensation of this "viscous" drag. To the operator, the gimbaled stages on the rig feel relatively friction free.

Adjustable-gain integrator 326 accepts angular rate signal 290 from difference amplifier 328 and operates to ensure that the stabilized camera platform reliably holds a stable orientation in the presence of cable, wind and gravitational forces that might otherwise cause drift. Integral control is especially useful and effective when an imperfectly balanced camera platform is stabilized in a pitched-up position, for example. A potentiometer 334 at the input facilitates adjustment of the integrator gain over the interval from 50 to 1000. Integrator gain adjustment may be accomplished by the operator by (a) first slowly increasing the gain at potentiometer 334 until a very low frequency oscillation is observed and (b) then reducing integrator gain slightly below the oscillation quenching point to ensure stable operation. Switch 330 is provided for temporarily disabling integrator 326 by shorting the integrator capacitor C. This integrator-disabling feature may be used when adjusting the proportional gain and when enhancing the response of controller channel 280 during rapid slewing. Control signal 310 is generated by summing the amplified angular rate signal 290 and the time-integrated version of angular rate signal 290. Control signal 310 is furnished to power amplifier 296, which then drives associated actuator motor 284.

Other useful control functions not shown in FIG. 10 include low-pass filtering control signal 310 to attenuate any mechanical resonance effects on controller channel 280 and an optional high-pass filter for angular rate signal 290 that may be switched to replace proportional or integral feedback to improve controller channel 280 rejection of low-frequency operator motion.

In FIG. 10, servo motor 284 is differentially driven by a pair of power amplifier stages 298A-B configured in a full or H-bridge configuration as part of power amplifier 296. Power amplifier stages 298A-B are embodied as high voltage, high current operational amplifiers. A typical power operational amplifier suitable for use with the system of this invention is the OPA548, available from Burr-Brown/Texas Instruments, for example. Control signal 310 is amplified with a gain of $+K_{PA}$ (nominally 5) by one amplifier stage 298A and amplified with a gain of $-K_{PA}$ by the other amplifier stage 298B. Power amplifier stages 298A-B are provided a gain greater than one to ensure they fully exploit the higher voltages supplied to them. The H-bridge configuration operates to better use the available battery voltage to drive motor 284 by generating the highest possible motor current, which provides the maximal torque. For example, a ±18 volt power supply may theoretically deliver a maximum ±36 volts (reduced by the voltage drop across power amplifiers 298A-B) to servo motor 284 for maximum available torque. In FIG. 10, the power operational amplifiers 298A-B each is current-limited (nominally to 4 amps) by a respective current limit setting resistor $R_{LIM}$ 336A-B and is also voltage-protected by a respective diode pair 338A-B, which operate to isolate the output stage from the over voltage effects of inductive motor load and commutating motor brushes. It may be readily appreciated that power amplifier 296 may also be embodied as a conventional transconductance amplifier arrangement, which may also be preferred in some circumstances because the current delivered to motor 284 is thereby made independent of motor coil resistance and back EMF voltage for any particular value of control signal 310, and motor torque is proportional to coil current. As discussed below in connection with FIG. 12, a more efficient H-bridge Pulse Width Modulated (PWM) amplifier may also be a preferred embodiment of power amplifier 296 in this power sensitive portable/battery power supply application.

Power amplifier 296 is preferably disposed on a single circuit board (not shown). Each servo amplifier board may be disposed alongside the associated actuator motor or may be disposed with the other servo amplifiers in a single group and/or disposed with the portable power supply or battery for the system. To achieve truly portable operation, untethered by cables to equipment, the portable power supply or battery pack should be located in the operator's belt pack or backpack or mounted directly to the handle frame of the rig. The same or similar battery that powers the camera may also power the stabilization system.

Figure 11:
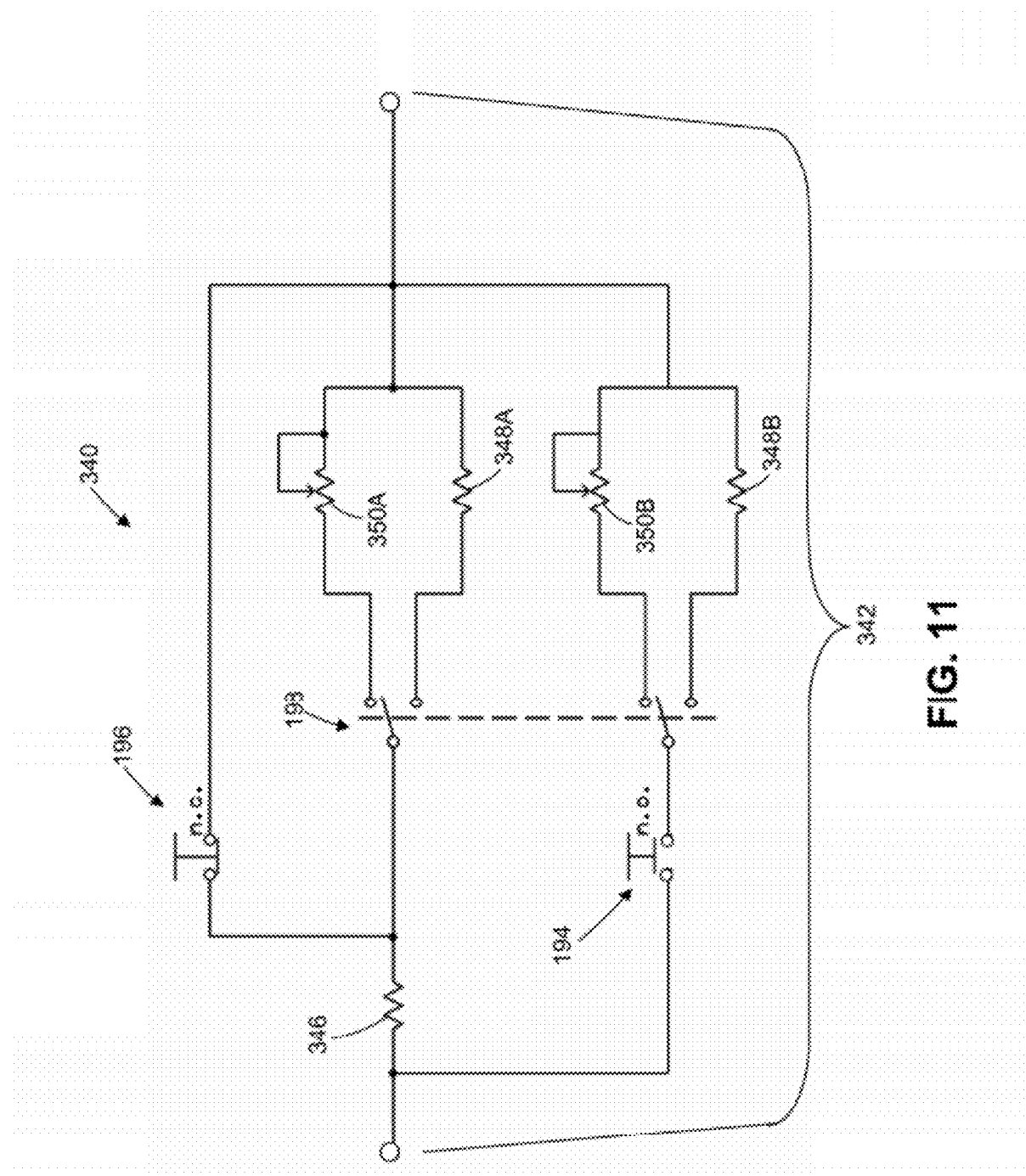
FIG. 11 is a schematic circuit diagram illustrating an exemplary embodiment of the control panel slew rate control and rate select switches of FIG. 6A.

FIG. 11 is a schematic circuit diagram illustrating an exemplary pitch slew control embodiment 340 of pitch-down pushbutton 194, pitch-up pushbutton 196, and multiposition pitch rate selector switch 198 (FIG. 6A), which modify the controller channel slew-rate control resistance ($R_{SLEWRATE}$) 342 (FIG. 10), whereby the stabilized camera platform is tilted up and down. Pitch slew control 340 embodies circuitry for one channel of the command circuit board (not shown), which is mounted to the back of control panel 182 (FIG. 6A). Pushbuttons 194-196 and selector switch 198 provide the means for the operator to slew the stabilized camera platform about the associated axis in either direction at a user-selectable fixed rate. This is facilitated by unbalancing the inputs to difference amplifier 328 (FIG. 10) by adding slew rate resistance 342 (nominally 5 kilohms) in series with the (nominally 15 kilohms) input resistor 344 for the reasons now described. In operation, difference amplifier 328 determines the difference between gyro sensor RateOut and RefOut signals 292 and 320 (FIG. 9). By changing the value of slew rate control resistance 342, difference amplifier 328 is induced to slightly increase or decrease the weight of the nominally 2.5 volts RefOut signal 320 and, thereby generate angular velocity signal 290 values that operate to slew the stabilized platform about the rotation axis associated with controller channel 280. As shown in FIG. 10, RefOut signal 320 is connected through a (nominally 20 kilohms) series resistance to difference amplifier 328. This series resistance includes slew rate control resistance $R_{SLEWRATE}$ 342 (nominally 5 kilohms) and input resistance 344 (nominally 15 kilohms). FIG. 11 shows slew rate control resistance $R_{SLEWRATE}$ 342 to be the effective series resistance provided by pitch slew control 340. Selecting an appropriate value of slew rate control resistance 342 facilitates rotation of the stabilized platform about the associated rotation axis without disturbing the control channel loop gain.

FIG. 11 further shows how the value of slew rate control resistance $R_{SLEWRATE}$ varies higher or lower than fixed resistance 346 as a function of switching a resistor in series or parallel with the fixed (nominally 5 kilohms) resistance 346 by depressing pushbutton switch 196 or pushbutton switch 194. For the slow slew rates useful for camera panning, for example, small changes are needed in $R_{SLEWRATE}$ from fixed resistance 346. For the faster slew rates, larger changes are needed in $R_{SLEWRATE}$ from fixed resistance 346. As the resistance value required for a desired slew rate and direction may be calculated using well-known circuit theory, the selection of component values is merely a design decision based on these teachings. FIG. 11 shows multi-position pitch rate selector switch 198 to be embodied as a double-pole-double-throw switch toggling between a pair of fixed resistors 348A-B and a pair of potentiometers 350A-B, for example, to provide the operator with a choice of using a fixed slew rate or a faster adjustable slew rate. It may be readily appreciated that the circuitry for slew rate control resistance 342 (FIG. 11) may be similarly applied to any control channel, including the control channels for yaw and for roll slewing.

Figure 12:
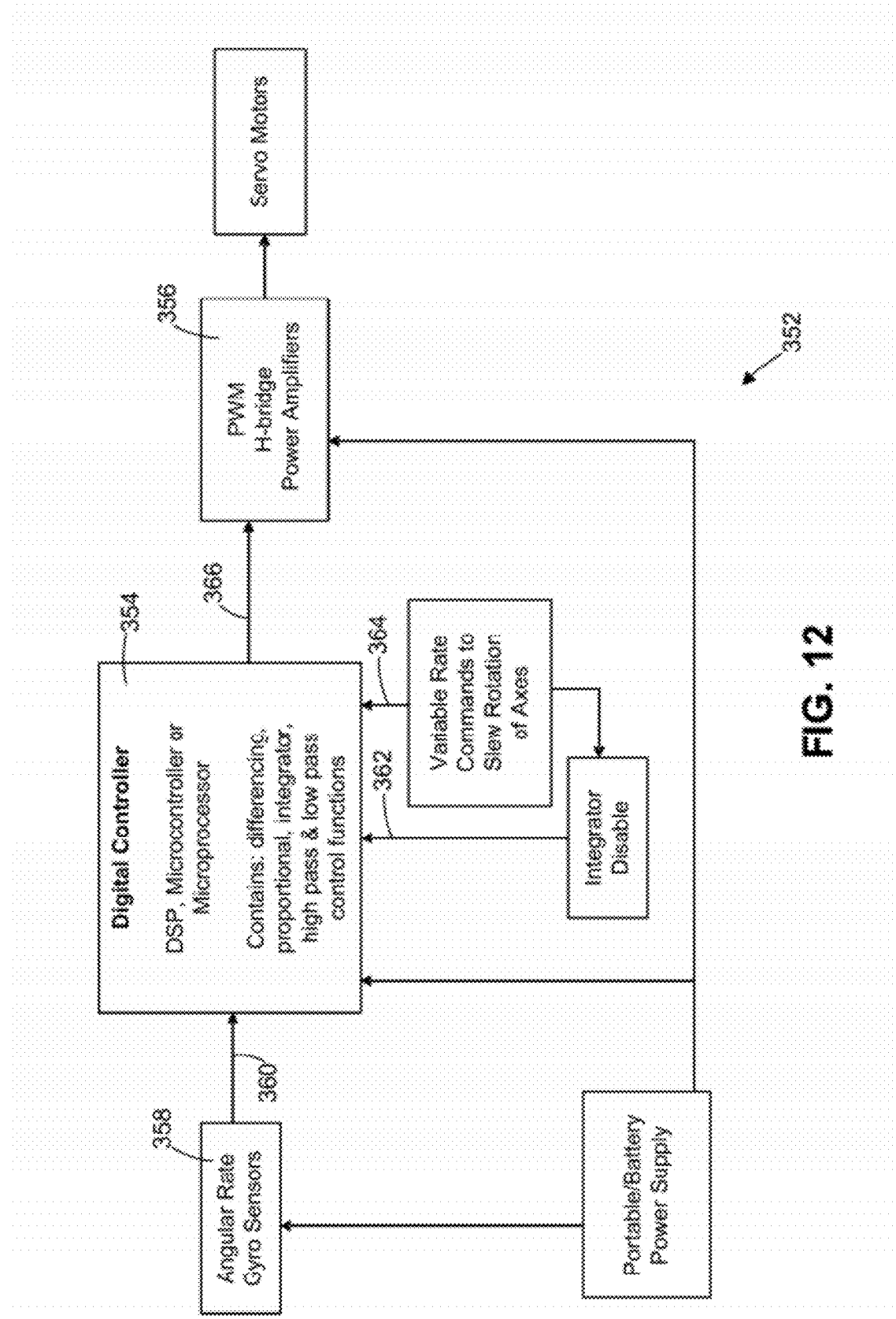
FIG. 12 is a schematic block diagram illustrating an exemplary digital embodiment of the stabilization system of this invention.

FIG. 12 is a schematic block diagram illustrating an exemplary digital stabilizer system embodiment 352 including a digital controller embodiment 354 including a plurality of controller channels each associated with motion about a single rotational axis, and a pulse width modulated (PWM) power amplifier embodiment 356 including a plurality of power amplifier channels each associated with a single controller channel, actuator motor and pivot assembly. PWM amplifiers 356 offer efficiencies of 90-95% and thereby facilitate the use of smaller batteries, smaller heat sinks and less ventilation than required for linear amplifier embodiments exemplified by power amplifier 296 (FIGS. 8-9). Linear power amplifier efficiency may fall below 50%, depending on output level. PWM amplifiers 356 may also be configured as H-bridge transconductance amplifiers, such as, for example, the family of PWM amplifiers available from Apex Microtechnology Corp.

System 352 replaces the analog electronics functions described above in connection with FIGS. 9-11 with the same or similar functions embodied in digital electronics. For example, the MEMS based angular rate gyro sensors 358 may provide a chip-level analog or digital serial output signal 360. A digital embodiment of sensor signals 360 is preferable in noisy environments to analog signals. For example, Analog Devices' iMEMS Yaw Rate Gyro with SPI Interface provides such a digital sensor output signal. Within digital controller 354, a digital signal processor (DSP), microcontroller or microprocessor (not shown) accepts analog or digital rate signals 360 from gyro sensors 358 and uses internal differencing, proportional and integral control functions and optional high-pass and low-pass filtering functions in hardware or firmware to provide the other controller channel functions according to this invention as described above. Digital controller 354 also receives the digital commands 362-364 for use in slewing about a rotation axis and for disabling the integrator function to improve dynamic response while slewing. Digital controller 354 passes either the analog or digital control signals 366 to PWM H-bridge power amplifiers 356. Inexpensive DSPs, microcontrollers and micro-processors with chip-level serial ports, A/D, D/A converters and PWM control functions suitable for use with the system of this invention are commercially available. The advantages of a digital embodiment includes lower cost, relative insensitivity to electrical noise without signal buffering and cable shielding, and programmability of control parameters, such as proportional and integral gain. Additional benefits include opportunities for firmware-based self-diagnostic and automatic calibration capabilities for servo loop gain and automatic nullification of gyro sensor offsets.

Figure 13:
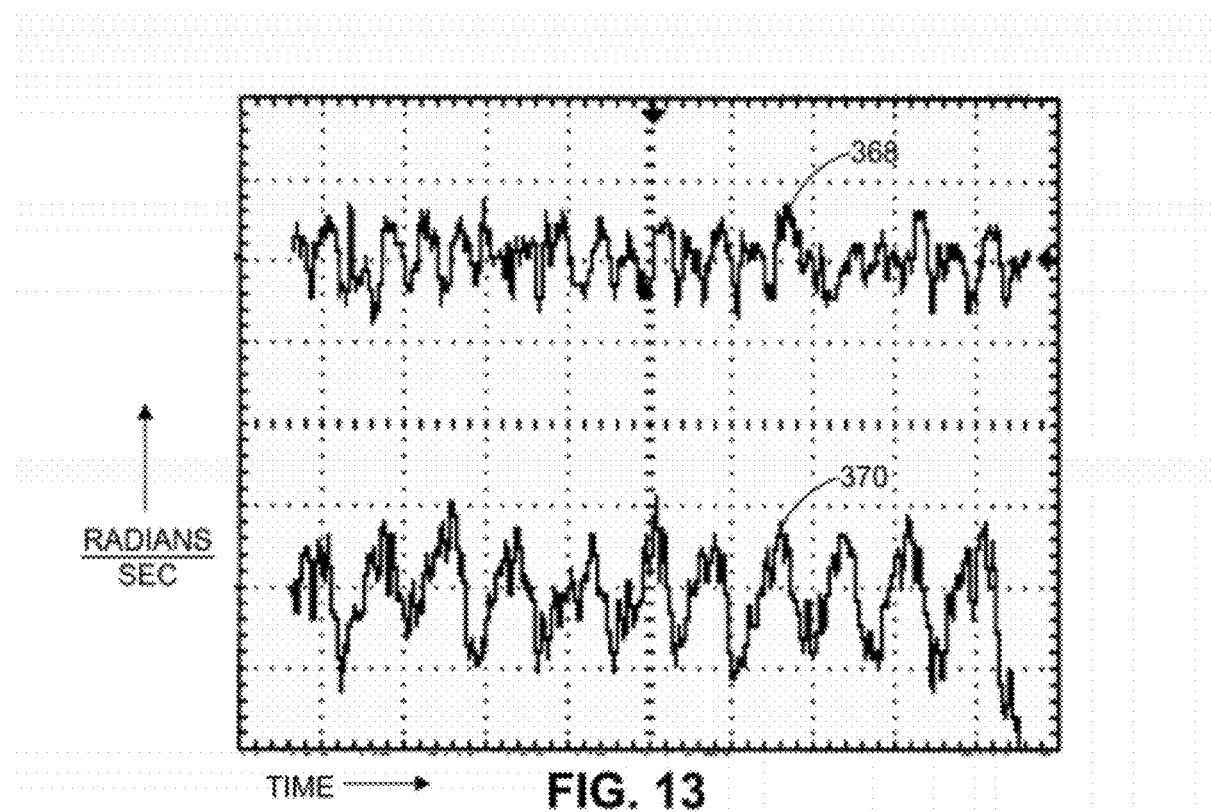
FIG. 13 is a chart illustrating the yaw and pitch rotation rates measured by the inventor while walking with the camera stabilization system embodiment of FIG. 1 while the pivot assemblies are locked in one position and the controller is inoperative.

FIG. 13 is a chart illustrating the yaw and pitch rotation rates measured by the inventor while walking at one step per second holding camera stabilization system 20 (FIG. 1) with pivot assemblies 48A-B and 52 locked immobile and with controller inoperative. The upper waveform 368 shows the measured output from yaw rotation rate sensor 76 and the lower waveform 370 shows the measured output from pitch rotation rate sensor 78. The peak-to-peak amplitudes of waveforms 368-370 indicate the degree of undesirable rotation imposed on stabilized camera platform 22 (FIG. 1) without the stabilization system of this invention.

Figure 14:
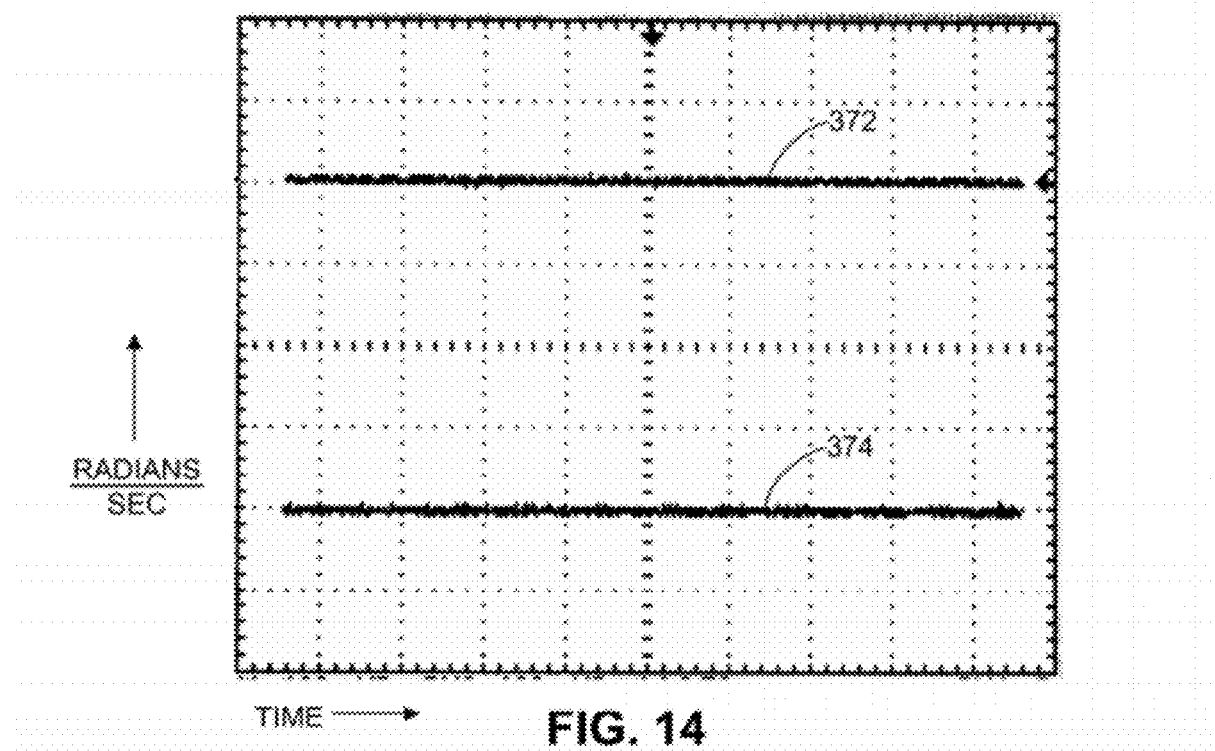
FIG. 14 is a chart illustrating the yaw and pitch rotation rates measured by the inventor while walking with the camera stabilization embodiment of FIG. 1 while the pivot assemblies and the controller are fully operational in accordance with this invention.

FIG. 14 is a chart illustrating the yaw and pitch rotation rates measured by the inventor while walking at one step per second holding camera stabilization system 20 (FIG. 1) with all mechanical and electronic elements fully operational in accordance with this invention. The upper waveform 372 shows the measured output from yaw rotation rate sensor 76 and the lower waveform 374 shows the measured output from pitch rotation rate sensor 78. The peak-to-peak amplitudes of waveforms 372-374 are nearly flat, indicating that system 20 is operating to eliminate nearly all undesired camera rotation shown in FIG. 13 as arising from the operator's erratic motion while walking. The same vertical and horizontal scaling is applied to illustrated waveforms 368, 370, 372 and 374.

Figure 15:
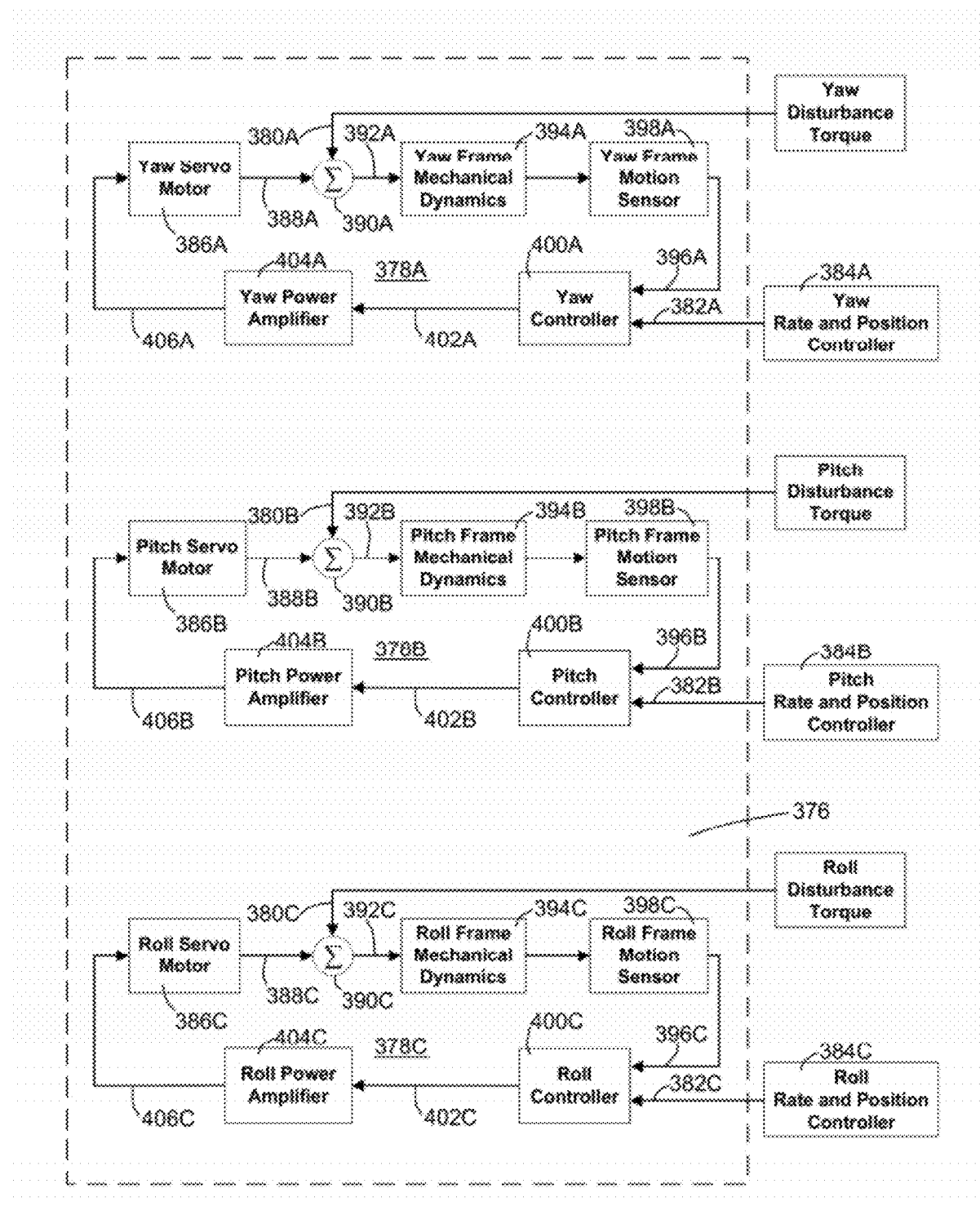
FIG. 15 is a schematic functional block diagram illustrating an exemplary three-axis embodiment of the motion simulator system of this invention.

FIG. 15 is a schematic functional block diagram illustrating an exemplary three-axis motion simulator system embodiment 376 of this invention. Motion simulator system 376 includes a plurality of substantially identical independent motion control channels exemplified by the yaw control channel 378A, the pitch control channel 378B and the roll control channel 378C. Each motion control channel 378 may be appreciated with reference to the above discussion of stabilizer systems 20 (FIG. 1) and 224 (FIG. 7) and the following discussion of yaw control channel 378A.

Yaw control channel 378A includes both mechanical and electrical elements that together operate to control the orientation of a stabilized platform (not shown) about the yaw axis (see, e.g., FIGS. 1 and 7), which may correspond to "panning" of a camera (not shown) fixed to the stabilized platform, for example. Yaw control channel 378A accepts two inputs; one effective mechanical input denominated the yaw disturbance torque 380A and one electronic input denominated the yaw slew signal 382A, which represents a predetermined sequence of positions about the yaw rotation axis received from, for example, a yaw rate and position controller 384A. The plurality of rate and position controllers 384A-C may be embodied as, for example, a processor with means for executing software for simulating motion for some purpose. For example, the motion simulation may be designed to move an otherwise stationary video camera through a predetermined sequence of positions intended to simulate to a viewer the filming of a scene from the deck of a ship or from the seat of an automobile. Alternatively, the motion simulation may be designed to move a video camera mounted in a moving automobile through a predetermined sequence of positions intended to simulate to a viewer the filming of a scene from the deck of a ship, for example, where the actual automobile motion is cancelled and the simulated ship motion added.

The mechanical elements of yaw control channel 378A include the yaw actuator motor 386A, which produces a yaw torque 388A that is added to yaw disturbance torque 380A at the functional summer 390A to produce yaw net torque 392A on the yaw gimbal frame (not shown). Yaw net torque 392A is transformed through the mechanical dynamics 394A of the yaw gimbal frame (not shown) and transduced to an electrical yaw sensor signal 396A by the yaw frame motion sensor 398A.

The electrical elements of yaw control channel 378A include the yaw controller 400A, which accepts yaw sensor signal 396A and yaw slew signal 382A and produces a yaw control signal 402A representing the error in yaw frame motion with respect to the motion demanded by yaw rate and position controller 384A as represented by yaw slew signal 382A. Finally, the electromechanical control loop is closed by passing yaw control signal 402A to the yaw power amplifier 404A, which produces the yaw motor signal 406A required to cause yaw actuator motor 386A to produce yaw torque 388A having the value necessary for smooth and precise motion of the stabilized platform (not shown) in accordance with the demands of yaw rate and position controller 384A and without the effects of yaw disturbance torque 380A.

Operation of pitch control channel 378B and roll control channel 378C may be readily appreciated with reference to the above discussion of yaw control channel 378A. Each of the plurality of motion control channels 378A-C operate independently of the others, both mechanically and electrically, which is an important advantage of the system of this invention, taught here for the first time.

Suitable Sensor Types: The rotational motion sensors are preferably embodied as independent miniature gyro sensors that measure the absolute rotation or rotational rate of the surfaces on which they are fixedly mounted. Such gyro sensors do not respond to relative motion or rotation between surfaces or frames. Although relative position sensors, such as encoders, resolvers and potentiometers and tilt or level sensors may be useful augmentation for the control system of the invention, they are not required for proper camera stabilization. The use of gyro sensors alone significantly reduces the cost and complexity of the stabilization system of this invention.

A MEMS-based angular rate sensor gyro chip is preferred. MEMS based rate gyro chip sensors, one per controlled axis of rotation, are useful for measuring the angular rate of the associated gimbaled frames when fixed close to the associated actuator motor as part of a pivot assembly. Because a MEMS gyro sensor is packaged as a silicon chip or integrated circuit, it is compact, which greatly facilitates collocation with the servo motor shaft or mounting on or in the associated gimbal frame close to the associated motor shaft. MEMS gyro sensors have the smallest size and weight, start immediately (no spin up delay), consume little electrical power, run silently, and are inexpensive.

Suitable angular rate sensing gyro chips with a nominal analog output sensitivity of 5 mV/°/sec and a range of ±300°/s are available, including the family of iMEMS Single Chip Yaw Rate Gyroscopes available from Analog Devices. The ADXRS300 is a 300 degree/second angular rate sensor (gyroscope) on a single chip, complete with all of the required electronics. The sensor is built using Analog Devices' proprietary iMEMS® surface micro-machining process, the same proven technology that has enabled the company to ship over 100 million inertial sensors. Two polysilicon sensing structures each contain a dither frame, which is electrostatically driven to resonance. A rotation about the z axis, normal to the plane of the chip, produces a Coriolis force which displaces the sensing structures perpendicular to the vibratory motion. This Coriolis motion is detected by a series of capacitive pickoff structures on the edges of the sensing structures. The resulting signal is amplified and demodulated to produce the rate signal output. The device is the only commercially available gyro to integrate a digitally controlled, full self-test feature that can be operated while the sensor is active. It includes a temperature sensor for easy-to-implement temperature coefficient calibration, as well as a precision voltage reference. It operates from 5V supply over the industrial temperature range of −40° C. to +85° C. and is available in a 32-pin Ball Grid Array surface-mount package measuring 7 mm by 7 mm by 3 mm.

Although other gyro technologies, such as small mechanical gyros, piezoelectric gyros, fiber optic gyros and integrated rate gyros could provide feedback for the closed-loop control system in this handheld camera stabilizer application, commercially available versions of products based on these technologies currently are significantly more expensive, larger and heavier. Each of these drawbacks is likely to preclude their use in a practical design of a compact, ergonomic handheld professional camera stabilizer product. In the future, other miniature, low cost angular rate, orientation or acceleration sensors may arise that may have the above cited advantages of the aforementioned MEMS based rate gyro sensor chips and therefore might be practical for this application.

Suitable Actuator Motors: Useful servo motors include DC brush motors, DC brushless motors, DC torque motors such as are used in hard disk drive head positioning actuators and ultrasonic motors such as are used in camera lens assemblies, etc. Relatively lightweight limited-angle direct-drive torque motors with no backlash can be designed with high torque constants using rare earth magnet materials and may not need to be commutated. It may be readily appreciated that these and other alternative motors and speed reduction approaches may be used in the system of this invention in various combinations, such as in coarse/fine actuator piggyback combinations, to actuate about all desired rotation axes in the system. The actuator motor may alternatively be so arranged that its stator or case is affixed to the movable part, and its shaft is affixed to the supporting structure.

Dynetic Systems' DC brush servo motors are preferred by the inventor because of the high torque-to-mass ratio, low cogging and low friction. By way of example, the high torque-to-mass ratio reduces overall system weight and the associated operator burden while also minimizing the battery power needed to apply sufficient torque to stabilize an unbalanced professional-sized video camera with a ±18 volt battery power supply. These servo motors are rated at 36 volts and have about 8 ohms of resistance, requiring about 4 amperes of current per axis, which is well within capacity with a 10:1 gear-head ratio.

Actuator Motor Speed Reduction: Each of the pitch servo motor and the yaw servo motor preferably include an integral speed reducing gear-head or other means for shaft speed reduction. A proper gear-head greatly reduces the load torque at the actuator motor, thereby reducing motor current and the power demanded by the motor, especially when supporting an unbalanced load against gravity or wind. For example, a 10:1 reducing gear-head requires about $\frac{1}{10}^{th}$ the sustaining torque from the servo motor and $\frac{1}{10}^{th}$ the sustaining current from the power amplifier and battery. System power consumption can be accordingly reduced in about the same ratio. An integral gear-head also allows the rotational load to be directly supported by the servo motor shaft, thereby eliminates any need for a supporting axle and the associated bearings. Because the speed reducing gear-head reduces the maximum motor speed at rated voltage, very high gear ratios are impractical for higher disturbance frequencies, but a 10:1 reduction motor speed is very practical for the handheld system of this invention because it facilitates all necessary compensation for operator motion. Alternatively, a 90° articulated gear-head may be used to improve overall design compactness because the pitch servo motor could thereby be mounted vertically and extending from or adjacent to the vertical yaw frame arm 44B (FIG. 1) instead of extending horizontally as shown in FIG. 1.

Low backlash speed reduction is also important to achieving smooth closed loop servo operation. Very inexpensive gear-heads, usually based on a spur gear, with gear slop or backlash of 3° or more may produce acceptable camera stabilization in the system of this invention, but may feel rough to the operator. It is therefore preferable to employ speed reduction with 1° or less backlash. Available single stage planetary gear heads, while more expensive and with slightly more friction than spur gear heads, offer backlash on the order of less than 10 arc minutes and are the preferred gear-head solution.

In an alternate speed reduction approach that offers zero backlash, a band drive is used to drive the pitch frame over its limited range of rotation, i.e. less than ±90°. Axles guided by ball bearings, which are attached to or embedded in the yaw frame, rotatably mount the pitch frame on both sides. On the driven side, the axle extends outward beyond the yaw frame into a large diameter drum to which it is attached. A small diameter drum located adjacent to the larger diameter cylinder is secured to the pitch motor shaft, which runs parallel to the driven axle. The servo motor mounted to the yaw frame, lacks a gear head and is therefore shorter than the servo motor and gear head combinations illustrated in FIG. 1. A thin metal band is wrapped around the two drums and secured at both ends by a single screw or pin radially extending into the large drum. With proper tensioning, the large drum is free to rotate slightly more than ±90° and offers a high stiffness drive system advantageous for closed loop control. Friction between the belt and the small cylinder ensures motion of the belt and the pitch frame as the small drum rotates. The ratio of drum diameters determines the speed reduction ratio. Alternate zero backlash speed reduction approaches, which may introduce more compliance into the drive train, include cable drives and belt and pulley systems.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A hand-held stabilization system comprising:
   a base;
   a stabilized platform including
      a first frame rotatably coupled to the base on a first pivot axis, including
         a first actuator disposed to torque the first frame about the first pivot axis responsive to a first motor signal, and
         a first rotational sensor having a rotation-sensitive sensor axis and producing a first sensor signal representing the rotation of the first frame with respect to the base; and
      a second frame rotatably coupled to the first frame on a second pivot axis, including
         a second actuator disposed to torque the second frame about the second pivot axis responsive to a first motor signal, and
         a second rotational sensor having a rotation-sensitive sensor axis and producing a second sensor signal representing the rotation of the second frame with respect to the first frame;
   at least one handle adapted for grasping by a human operator to facilitate moving the hand-held stabilization system about during operation; and
   a controller for producing each of the motor signal plurality responsive to a respective one of the sensor signal plurality, whereby the stabilized platform is disposed in a predetermined position independent of the position of the base.

2. The system of claim 1 further comprising:
   in the stabilized platform,
      a third frame rotatably coupled to the second frame on a third pivot axis, including
         a third actuator disposed to torque the third frame about the third pivot axis responsive to a first motor signal, and
         a third rotational sensor having a rotation-sensitive sensor axis and producing a third sensor signal representing the rotation of the third frame with respect to the first frame.

3. The system of claim 2 wherein:
   the rotation-sensitive sensor axis of at least one of the rotational sensor plurality is disposed at a fixed angle with respect to the corresponding one of the pivot axis plurality.

4. The system of claim 1 wherein:
   the rotation-sensitive sensor axis of at least one of the rotational sensor plurality is disposed at a fixed angle with respect to the corresponding one of the pivot axis plurality.

5. The system of claim 1 wherein:
   the rotation-sensitive sensor axis of at least one of the rotational sensor plurality is disposed in substantial alignment with the corresponding one of the pivot axis plurality.

6. The system of claim 1 wherein the actuators are selected from the group consisting essentially of:
   direct current (DC) brush motors, DC brush less motors, DC torque motors, linear solenoids stepper motors, ultrasonic motors, geared motors, speed-reduced motors, hydraulic actuators, pneumatic actuators, and piggybacked motor combinations.

7. The system of claim 1 wherein:
   at least one of the rotational sensor plurality is fixed to the corresponding one of the frame plurality.

8. The system of claim 1 wherein the sensors are selected from the group consisting essentially of:
   angular rate sensors, integrated rate gyro sensors, angular position sensors, angular accelerometers, absolute rotation sensors, and inertial rotation sensors.

9. The system of claim 1 wherein:
   in at least one of the frame plurality, a mechanical adjustor for repositioning the corresponding pivot axis with respect to the stabilized platform, whereby the stabilized platform may be reoriented with respect to the at least one pivot axis.

10. The system of claim 1 wherein
    a slew controller for producing a slew signal; and
    in the controller, a processing circuit for accepting the slew signal and for responsively changing the predetermined stabilized platform position with respect to at least one rotation axis.

11. The system of claim 1 wherein:
    the rotation-sensitive sensor axis of at least one of the rotational sensor plurality is disposed in substantial alignment with the corresponding one of the pivot axis plurality.

12. The system of claim 1 wherein the actuators are selected from the group consisting essentially of:
    direct current (DC) brush motors, DC brush less motors, DC torque motors, linear solenoids stepper motors, ultrasonic motors, geared motors, speed-reduced motors, hydraulic actuators, pneumatic actuators, and piggybacked motor combinations.

13. The system of claim 1 wherein:
    at least one of the rotational sensor plurality is fixed to the corresponding one of the frame plurality.

14. The system of claim 1 wherein the sensors are selected from the group consisting essentially of:
    angular rate sensors, integrated rate gyro sensors, angular position sensors, angular accelerometers, absolute rotation sensors, and inertial rotation sensors.

15. The system of claim 1 wherein:
    in at least one of the frame plurality, a mechanical adjustor for repositioning the corresponding pivot axis with respect to the stabilized platform, whereby the stabilized platform may be reoriented with respect to the at least one pivot axis.

16. The system of claim 1 wherein
    a slew controller for producing a slew signal; and
       in the controller, a processing circuit for accepting the slew signal and for responsively changing the predetermined stabilized platform position with respect to at least one rotation axis.

17. A mobile stabilization system comprising:
    a base;
    a stabilized platform including a first frame rotatably coupled to the base on a first pivot axis, including
- a first actuator disposed to torque the first frame about the first pivot axis responsive to a first motor signal, and
- a first rotational sensor having a rotation-sensitive sensor axis and producing a first sensor signal representing the rotation of the first frame with respect to the base; and a second frame rotatably coupled to the first frame on a second pivot axis, including
- a second actuator disposed to torque the second frame about the second pivot axis responsive to a first motor signal, and
- a second rotational sensor having a rotation-sensitive sensor axis and producing a second sensor signal representing the rotation of the second frame with respect to the first frame;

a mounting assembly adapted for fixing the mobile stabilization system to a vehicle to facilitate moving the mobile stabilization system about during operation; and a controller for producing each of the motor signal plurality responsive to a respective one of the sensor signal plurality, whereby the stabilized platform is disposed in a predetermined position independent of the position of the base.

18. The system of claim 17 further comprising:
in the stabilized platform,
- a third frame rotatably coupled to the second frame on a third pivot axis, including
  - a third actuator disposed to torque the third frame about the third pivot axis responsive to a first motor signal, and
  - a third rotational sensor having a rotation-sensitive sensor axis and producing a third sensor signal representing the rotation of the third frame with respect to the first frame.

19. The system of claim 18 wherein:
the rotation-sensitive sensor axis of at least one of the rotational sensor plurality is disposed at a fixed angle with respect to the corresponding one of the pivot axis plurality.

20. The system of claim 17 wherein:
the rotation-sensitive sensor axis of at least one of the rotational sensor plurality is disposed at a fixed angle with respect to the corresponding one of the pivot axis plurality.

* * * * *